US010764219B2

(12) United States Patent
Nolan et al.

(10) Patent No.: US 10,764,219 B2
(45) Date of Patent: Sep. 1, 2020

(54) MESSAGE SCHEMA CONTROL

(71) Applicant: Intel Corporation, Santa Clara, CA (US)

(72) Inventors: Michael Nolan, Maynooth (IE); Niall Cahill, Galway (IE); Keith Nolan, Mullingar (IE); John Brady, Celbridge (IE); Mark Kelly, Leixlip (IE)

(73) Assignee: Intel Corporation, Santa Clara, CA (US)

( * ) Notice: Subject to any disclaimer, the term of this patent is extended or adjusted under 35 U.S.C. 154(b) by 19 days.

(21) Appl. No.: 16/306,353

(22) PCT Filed: Jun. 30, 2016

(86) PCT No.: PCT/US2016/040516
§ 371 (c)(1),
(2) Date: Nov. 30, 2018

(87) PCT Pub. No.: WO2018/004622
PCT Pub. Date: Jan. 4, 2018

(65) Prior Publication Data
US 2019/0132269 A1 May 2, 2019

(51) Int. Cl.
*H04L 12/58* (2006.01)
*H04L 29/08* (2006.01)
(52) U.S. Cl.
CPC ............ *H04L 51/046* (2013.01); *H04L 29/08* (2013.01); *H04L 51/12* (2013.01); *H04L 51/34* (2013.01); *H04L 67/12* (2013.01); *H04L 67/125* (2013.01); *H04L 67/2833* (2013.01)

(58) Field of Classification Search
CPC ..... H04L 51/046; H04L 29/08; H04L 67/125; H04L 67/2833; H04L 51/12; H04L 51/34; H04L 67/12
See application file for complete search history.

(56) References Cited

U.S. PATENT DOCUMENTS

2016/0072899 A1   3/2016  Tung et al.
2016/0094395 A1*  3/2016  Hu ..................... H04W 28/16
                                                  370/254
2016/0156513 A1   6/2016  Zhang et al.

FOREIGN PATENT DOCUMENTS

WO      2015126734 A1    8/2015

OTHER PUBLICATIONS

Tian He et al. ('AIDA: Adaptive Application-Independent Data Aggregation in Wireless Sensor Networks' In: ACM Transactions on Embedded Computing Systems, vol. 3, No. 2, May 2004, pp. 426-457; hereinafter Tia). (Year: 2004).*
International Search Report for Related PCT Application PCT/US2016/040516 filed Jun. 30, 2016 dated Mar. 28, 2017, 3 pages.
(Continued)

*Primary Examiner* — Michael A Keller
(74) *Attorney, Agent, or Firm* — International IP Law Group, P.L.L.C.

(57) ABSTRACT

A method and apparatus for controlling message schema and size for internet-of-things (IoT) devices is provided. An exemplary method includes receiving an orchestration message from a downstream device, and calculating a new message size for a current schema, based, at least in part, on the orchestration message. A data message using the new message size and the current schema.

26 Claims, 14 Drawing Sheets

(56) References Cited

OTHER PUBLICATIONS

Tian He et al. "AIDA: Adaptive Application-Independent Data Aggregation in Wireless Sensor Networks" In: ACM Transactions on Embedded Computing Systems; vol. 3, No. 2, May 2004, pp. 426-457.

* cited by examiner

300

400

500

700

MESSAGE SCHEMA CONTROL

CROSS REFERENCE TO RELATED APPLICATIONS

Pursuant to 35 U.S.C. § 371, this application is the United States National Stage Application of International Patent Application No. PCT/US2016/040516, filed on Jun. 30, 2016, the contents of which are incorporated by reference as if set forth in their entirety herein.

TECHNICAL FIELD

The present techniques relate generally to Internet of Things (IoT) devices. More specifically the present techniques relate to devices that can manage communication congestion by controlling message schema.

BACKGROUND

It has been estimated that the Internet of Things (IoT) may bring Internet connectivity to 50 billion devices by 2020. However, this number of devices may lead to substantial crowding of communications channels between IoT devices and the coordinators or servers that are receiving the data, especially during equipment failures. The crowding of the communications channels may lead to the loss of messages from individual IoT devices, leading to incomplete data sets.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1A:
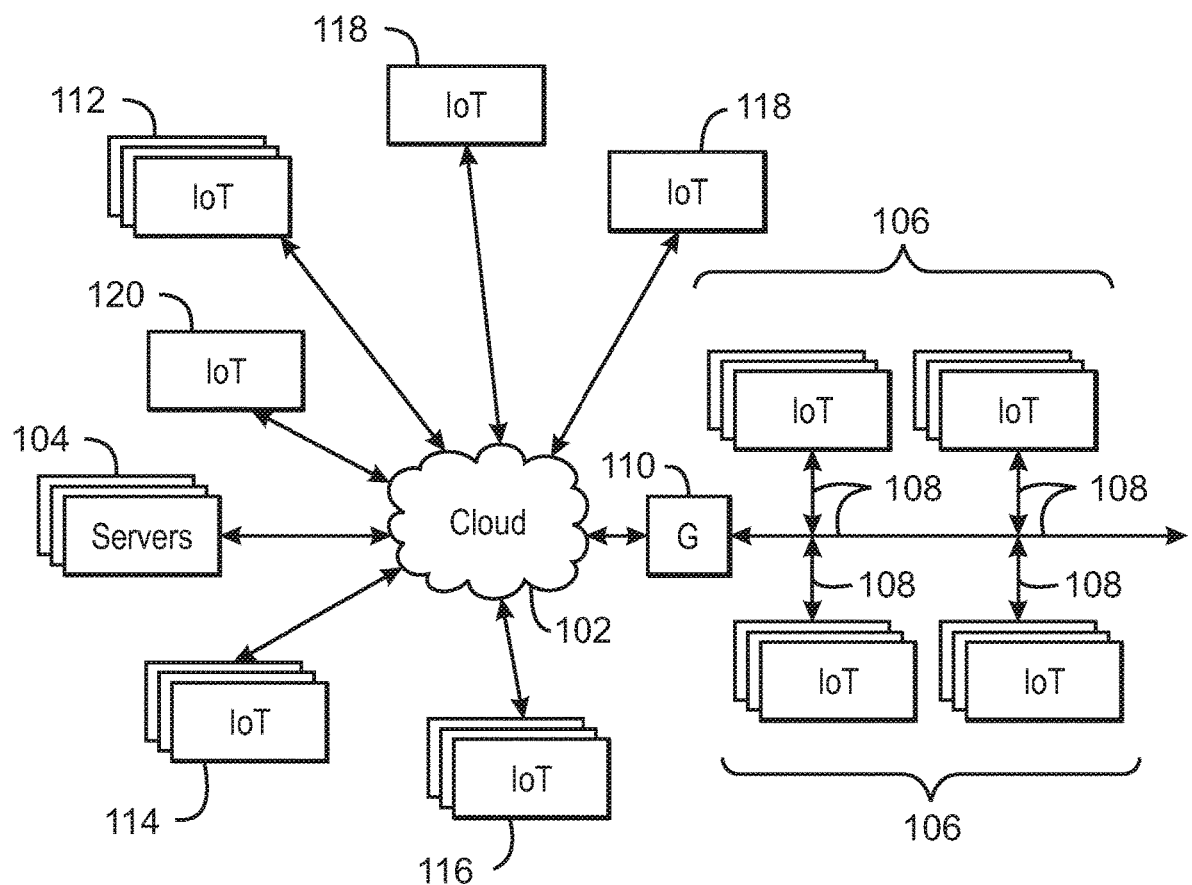
FIG. 1A is a drawing of a cloud-computing network, or cloud, in communication with a number of Internet of Things (IoT) devices, at least some of which are communicating with servers.

The internet of things (IoT) is a concept in which a large number of computing devices are interconnected to each other and to the Internet to provide functionality and data acquisition at very low levels. For example, IoT networks may include commercial and home automation devices, such as water distribution systems, electric power distribution systems, pipeline control systems, plant control systems, light switches, thermostats, locks, cameras, alarms, motion sensors, and the like. These devices, termed IoT devices herein, may be accessible through remote computers, servers, and other systems, for example, to control systems or access data. Further IoT devices may include IoT gateways, used to couple other IoT devices to cloud applications.

Global deployments of IoT devices generally rely on communications to back end cloud based services. Given the scale of the underlying wireless networks involved in the global deployment of billions of IoT devices, outages and loss of network connectivity may often occur. The temporary network connectivity issues may result in the loss of valuable sensor data and may significantly increase the network load and backend server processing requirements when cached messages are dispatched or replayed.

The techniques described herein provide an efficient scheme for increasing data flow from a sensor device to a downstream device, wherein a schema used to package the messages is changed depending on the loading on a downstream device. As used herein, the message schema used may be selected from three different message schema. As used herein, a message is sent when the process to move the data from the sending device begins. Generally, the sending device will confirm that the message has been received at the target device, but the techniques described herein are not limited to completion or confirming that the message has been received.

A first schema, termed single sample schema, or SSS, herein, sends a single data point from a single device. This schema is the least efficient in terms of data transfer, since each data point has individual identifying information included in the message. A second schema, termed single device schema, or SDS herein, includes multiple sensor readings from a single device, using shared identifying information. A third message schema, termed multiple device schema, or MDS herein, includes multiple sensor readings from multiple devices. The message schema and size selected is based on the operational context of the sending entity and the state of congestion across the network. The use of the dynamic system may increase the capacity at which a back-end service can consume data when required, for example, to deal with a sensor storm or to allow an increase in the number of sensor devices in the network. It may be noted that the overhead for the schema is independent of the headers and footers added by the sending protocol.

As described herein, the message schema may be changed based on messages from downstream devices in an orchestrated manner or may be changed by the sending devices themselves, for example, using a cost function. In the orchestrated example, a downstream device, or data sink, may send a message to an upstream device, or data source, to change to a different schema. This may be based on triggers such as a growing backlog of messages or the detection of network or cloud side congestion.

In the closed loop example, the sending device itself chooses the message schema used to send the data. A cost function may be calculated to determine the lowest cost, or highest efficiency, message schema. This information may then be used by a schema manager and a schema dispatcher to package and send the sensor data messages. In this example, the optimizations of may be implemented by each IoT network device and work independently of knowledge of the network topology.

FIG. 1A is a drawing of a cloud computing network, or cloud 102, in communication with a number of Internet of Things (IoT) devices, at least some of which are communicating with servers 104. The cloud 102 may represent the Internet or may be a wide area network (WAN), such as a proprietary network for a company. The IoT devices may include any number of different types of devices, grouped in various combinations. For example, a traffic control group 106 may include IoT devices along streets in a city. These IoT devices may include stoplights, traffic flow monitors, cameras, weather sensors, and the like. The traffic control group 106, or other subgroups, may be in communication with the cloud 102 through a sub-network 108, such as a local area network, wireless local area network, and the like. The IoT devices may use another device, such as a gateway 110 to communicate with the cloud 102.

Other groups of IoT devices may include remote weather stations 112, local information terminals 114, alarm systems 116, automated teller machines 118, and alarm panels 120, among many others. Each of these IoT devices may be in communication with other IoT devices, with servers 104, or both.

As can be seen from FIG. 1, a large number of IoT devices may be communicating through the cloud 102. Each of these IoT devices may generate a time sequenced data stream including, for example, a sensor data stream. For example, the traffic control group 106 of IoT devices, may send traffic counts, traffic speed, images, precipitation amounts, temperature measurements, and the like. Given the number of IoT devices that are sending data, the network loading may be substantial. If any problems develop in the data pipeline from the IoT devices, in the cloud 102, or at the servers 104, data may be out of sequence or lost.

Auto-scaling services in the cloud 102 may help with alleviating some of this problem. However, such services may be substantially more expensive than fixed, reserved capacity systems. Further, these systems take time to come online and add complexity to the back-end service. The variable nature makes the cost of such services difficult to predict, particularly in fast growing or organic IoT network, for example, as devices are added or removed as needed for specific purposes.

Further, auto-scaling services are less helpful to infrastructure providers who must provision physical IoT compute capacity at locations close to the edge, in the fog, at customer sites or in their own private data centers. The ability on an IoT network to absorb large variations in data observations without provisioning additional back-end capacity may be valuable in allowing the growth of an organic IoT network.

Furthermore, existing commercial end-to-end IoT systems are still focused on connectivity, for example, reliable data flow, and actuation of basic IoT devices, such as heaters, lights, and the like. They are point solutions intended for a single, limited purpose. This misses the opportunity to dynamically optimize the operation of the overall system.

As described in further detail herein, the network congestion may be monitored to change the functionality of the IoT devices, e.g., controlling the message schema used for data transfer. This may be performed by schema control messages sent from data sinks, such as the server 104, devices in the cloud 102, an IoT gateway 110, to a data source, such as an IoT device. Further, the IoT devices themselves may monitor the traffic to implement the schema control in a closed loop system. The schema control may be implemented in the network shown in FIG. 1A, or in a fog application.

Figure 1B:
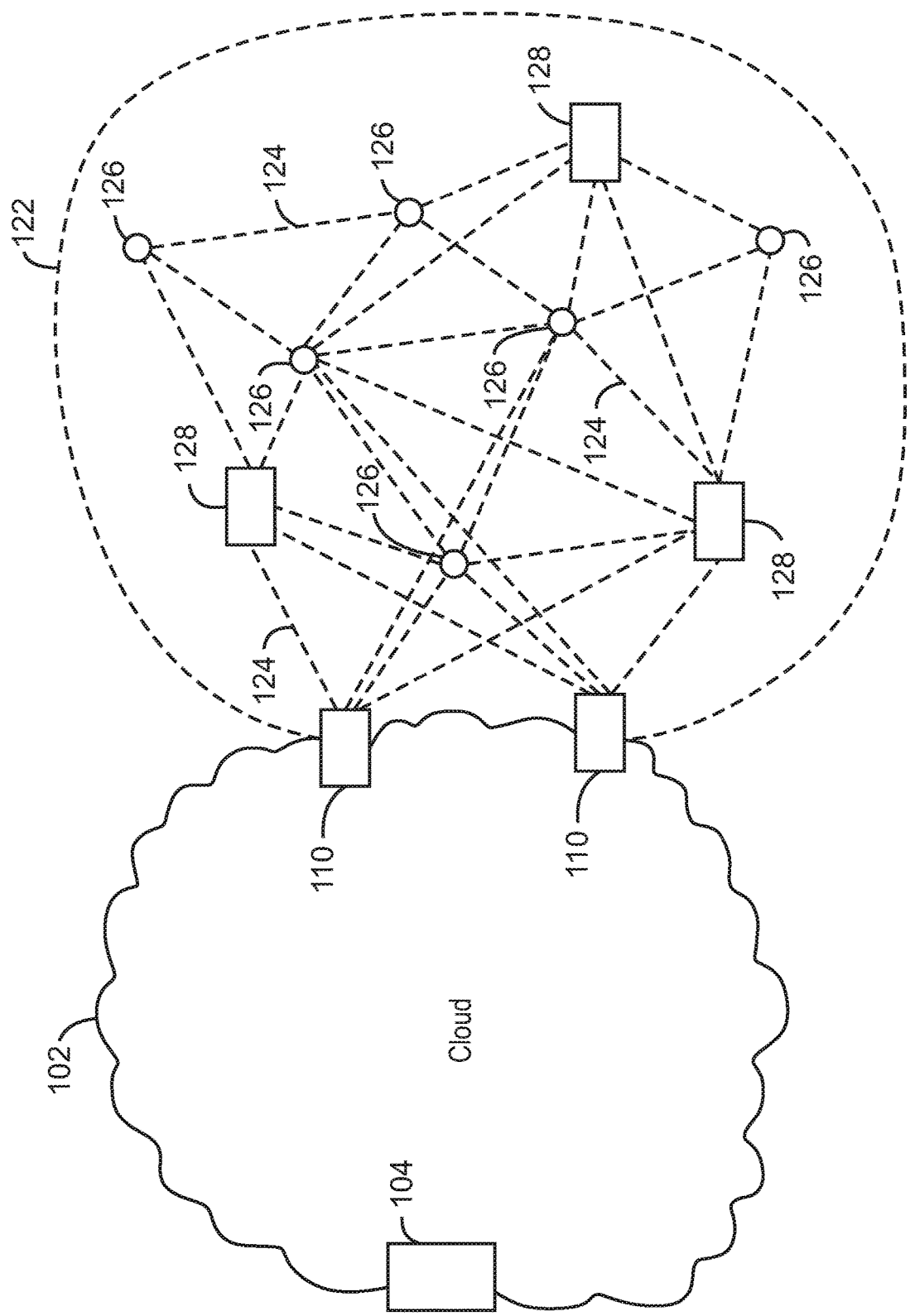
FIG. 1B is a drawing of a cloud computing network, or cloud, in communication with a mesh network of IoT devices, which may be termed a fog, operating at the edge of the cloud.

FIG. 1B is a drawing of a cloud computing network, or cloud 102, in communication with a mesh network of IoT devices, which may be termed a fog 122, operating at the edge of the cloud 102. To simplify the diagram, not every IoT devices is labeled.

The fog 122 may be considered to be a massively interconnected network wherein a number of IoT devices are in communications with each other, for example, by radio links 124. Each of the IoT devices may be considered a node within the network, wherein IoT devices that send out data messages to downstream IoT devices are considered source nodes. Devices, either in the fog 122, or in the cloud 102, that receive data messages from upstream devices are considered sink nodes.

The intercommunication protocol may be in accordance with the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the optimized link state routing (OLSR) Protocol, or the better approach to mobile ad-hoc networking (B.A.T.M.A.N.), among others. The techniques for controlling message schema and size described herein may be used with any number of other high and low level communication protocols, including, for example, 6LowPan, LickLiber, CoAP, TCP/IP, MQTT, ONVIF, and the like.

Three types of IoT devices are shown in this example, gateways 110, sensors 126, and aggregators 128, although any combinations of IoT devices and functionality may be used. The gateways 110 may be edge devices that provide communications between the cloud 102 and the fog 122, and may also function as data sinks that send schema control messages to the sensors 126 or aggregators 128. The sensors 126 may collect sensor data, and provide the sensor data to the aggregators 128, the gateways 110, or both. The aggregators 128 may collect and send data from multiple sensors 126, for example, aggregating the data according to the schema described herein. The aggregators 128 may also provide computational services to the fog 122, among other functions. In some examples, the aggregators 128 may not be present, and data may be aggregated into messages according to the schema in the gateways 110, or by the sensors 126 themselves. The aggregated data messages may be passed along to the cloud 102 through the gateways 110.

Communications from any IoT device may be passed along the most convenient path between any of the IoT devices to reach the gateways 110. In these networks, the number of interconnections provide substantial redundancy, allowing communications to be maintained, even with the loss of a number of IoT devices.

The fog 122 of these IoT devices, or fog of devices, may be presented to devices in the cloud 102, such as a server 104, as a single device located at the edge of the cloud 102, e.g., a fog 122 device. In this example, the data messages coming from the fog 122 device may be sent without being identified as coming from a specific IoT device within the fog 122, such as a specific aggregator 128. For example, a data message in an MDS format, including multiple data points from multiple sensors 126, may be sent without identifying the specific aggregator 128 that created and sent the message. In this example, any one of the aggregators 128 may create the message using the various message schema, for example, SSS, SDS, or MDS.

In some examples, the IoT devices may be configured using an imperative programming style, e.g., with each IoT device having a specific function. However, the IoT devices forming the fog 122 device may be configured in a declarative programming style, allowing the IoT devices to reconfigure their operations and determine needed resources in response to conditions, queries, and device failures. For example, a sensor 126 may build a message that includes data from itself and other sensors 126 using a more complex schema without the intervention of other devices, such as an aggregator 128. The data collected for the message may be in response to a query from a user located at a server 104. The sensor 126 may select the devices needed to answer the query, collect the data, aggregate the data into the message, and send the message.

The IoT networks described with respect to FIGS. 1A and 1B gather data and send it to a destination, such as a server 104, to be analyzed with the intention of allowing actions to be taken based on data observations. The process for gathering the data falls broadly into the three categories. In a first category, sensors generate data at regular intervals producing relatively fixed message sizes and predictable data volumes. In a second category, events may cause sensors to produce data on demand or as the condition they are monitoring changes. This results in message and data volumes which are highly variable. Once sensor data is received, a third category, termed a payload exchange, may take place. The third category involves a larger data exchange between a sensor 126 and a back-end, such as a server 104, and typically takes place after, or in response to, one of the previous message types.

IoT networks in the first category face a problem where their growth, for example, the organic addition of new devices to the network, is limited by a requirement to provision sufficient back-end capacity to meet the demand. IoT networks of the latter two categories have substantial variation in message and data volumes, and, thus, the back-end systems must be sufficiently over-provisioned to meet peak loads. The dynamic optimization of messaging described herein, varies the message schema and size based on the operational context of the sending entity and the state of congestion across the network. This dynamic system substantially increases the capacity at which the server 104, or other back-end device, can consume data when required.

Figure 2:
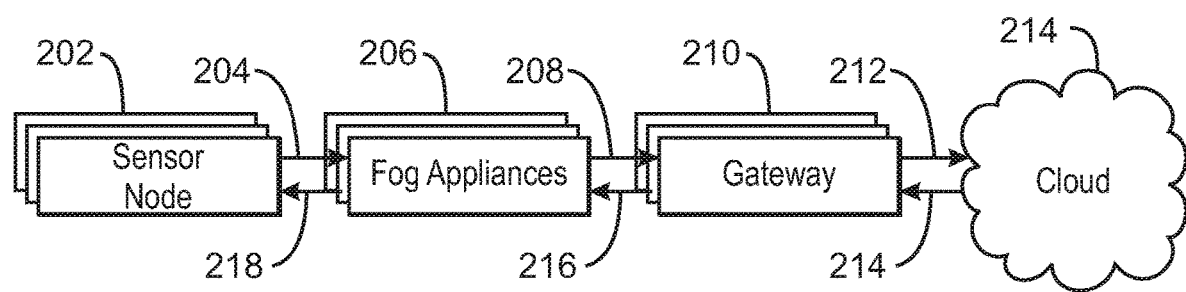
FIG. 2 is a block diagram of an IoT system used to test the techniques described herein

FIG. 2 is a block diagram of an IoT system 200 used to test the techniques described herein. In this simplified view, one or more sensor devices 202 act as data sources that send data 204 to fog appliances 206 that act as data sinks. The fog appliances 206 may be other sensor devices 202, aggregators, or other units in the fog. The fog appliances 206 may act as data source, sending data 208 to gateways 210 that act as data sinks. The gateways 210 may act as data sources, sending data 212 to devices in the cloud 214, that act as data sinks.

The exact number and arrangement of the various units 202, 206, and 210 may be varied depending on the specific system. For example, the fog appliance 206 may be omitted, giving a system more like FIG. 1A or included, resulting in a system more like FIG. 1B.

Figure 6:
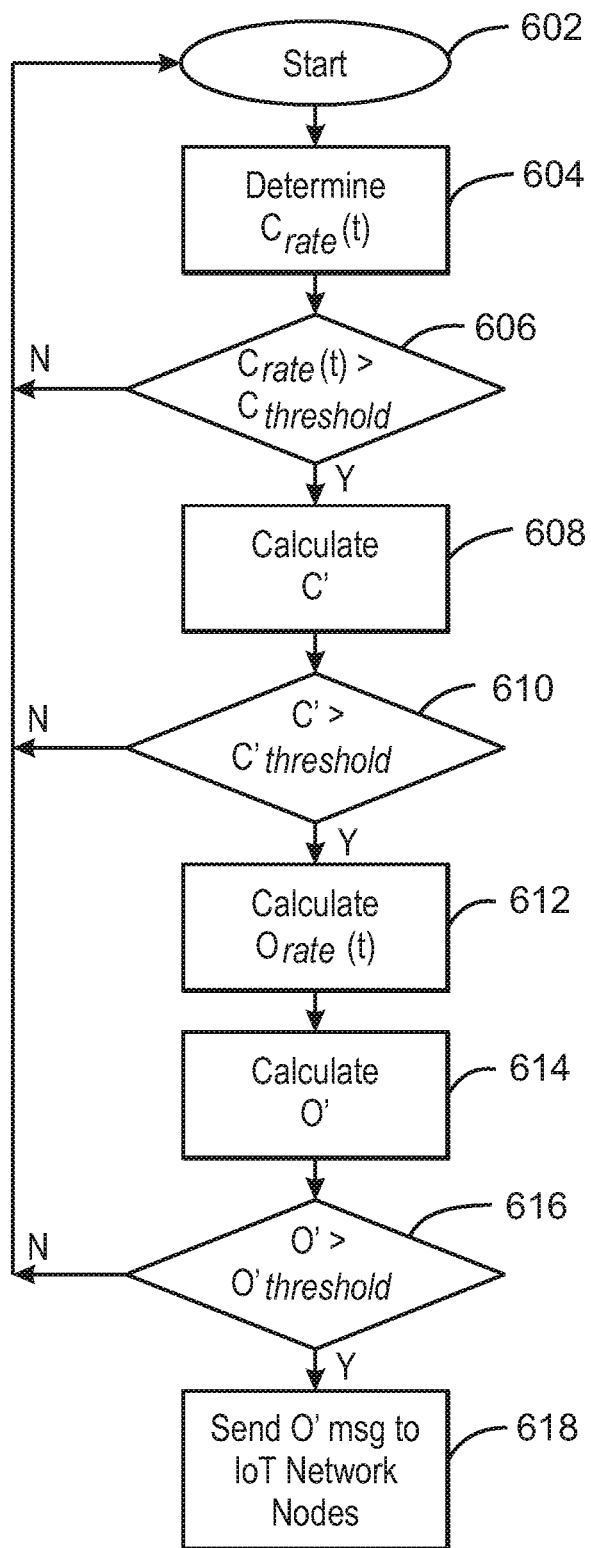
FIG. 6 is a process flow diagram of a method for orchestrating message schema.
Figure 7:
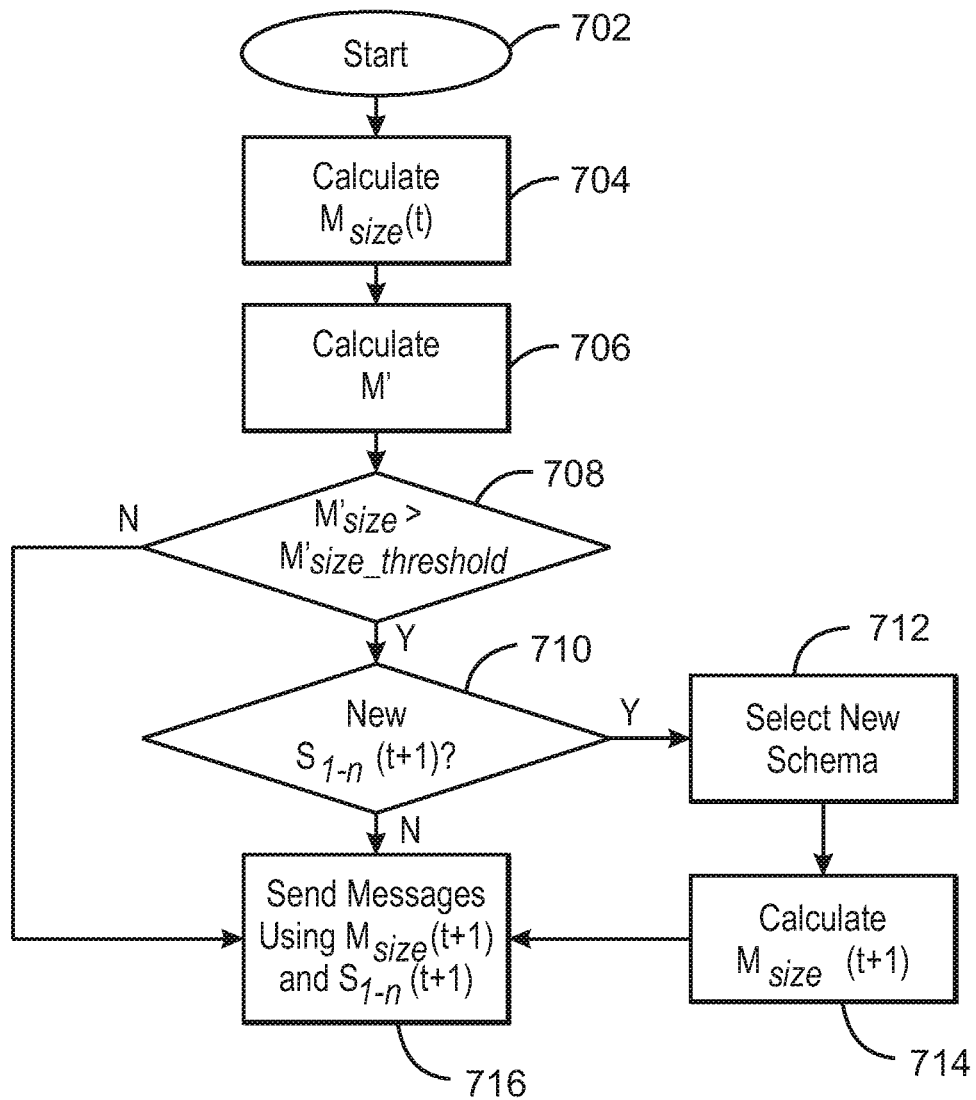
FIG. 7 is a process flow diagram of a method for determining schema and message size at a source node.
Figure 8:
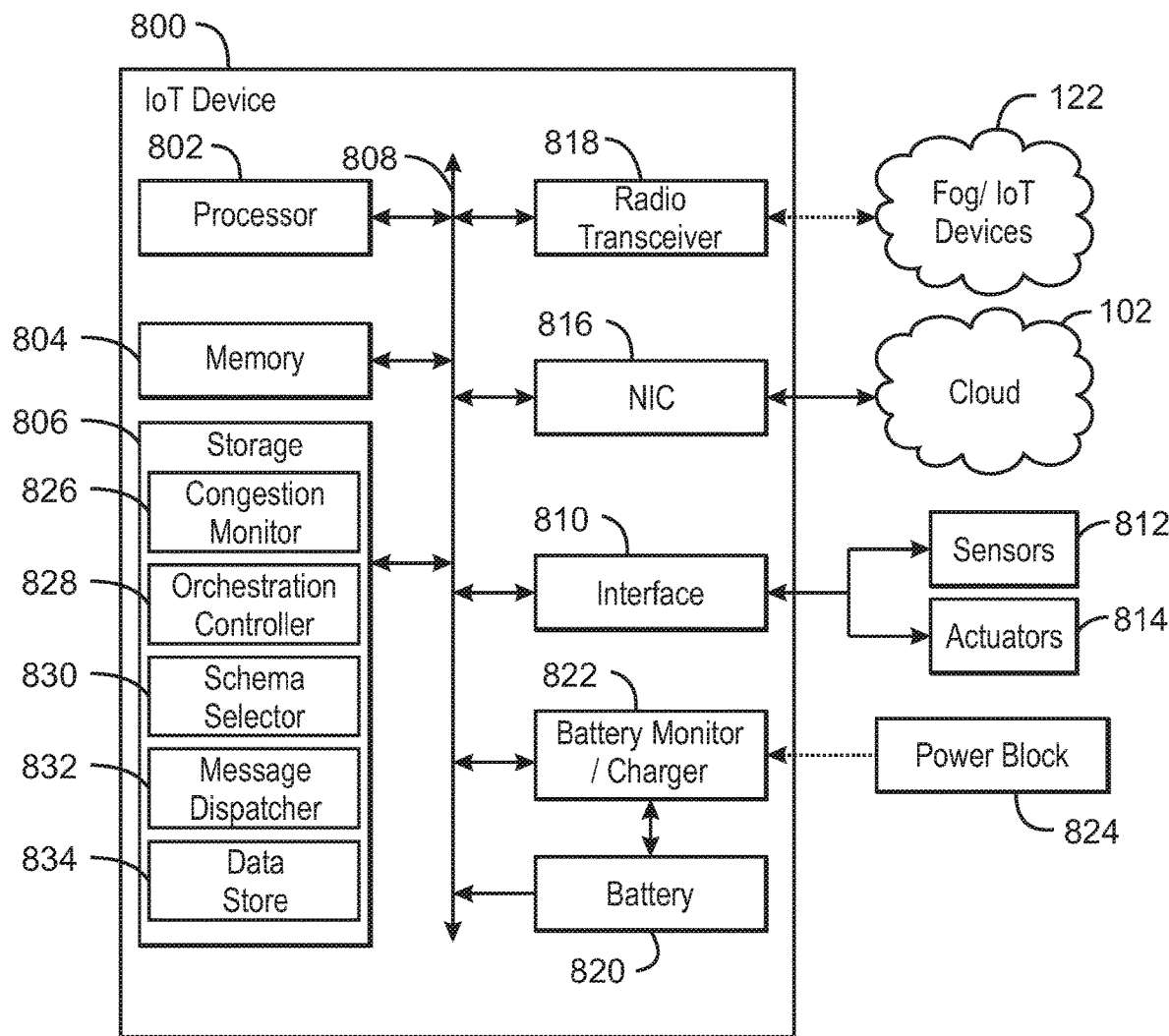
FIG. 8 is a block diagram of components that may be present in an IoT device to control message schema selection.

As described with respect to FIGS. 6-8, an orchestration message 214, 216, or 218 may be sent to a data source from a data sink to start a change in message size or schema. The message may specify the message schema and size to be used, or may inform the data source that a change is needed due to heavy traffic, for example, sending a value that represents the congestion as a number between zero and one. The techniques may be implemented at any, or at all, aggregation points, for example, the data sinks, across the network.

In some examples, no orchestration message 214, 216, or 218 is used, as the data source, such as a sensor device 202, a fog appliance 206, or a gateway 210, may determine itself that the downstream data sink is having congestion issues, for example, by determining that a backlog of messages is accumulating in system memory. In this example, the data source may use a cost function to determine the optimum message schema and size. This example is described further with respect to FIGS. 9-11.

Examples of the message schema, SSS, SDS, and MDS are shown in the following JavaScript Object Notation (JSON) examples. As discussed, the SSS supports a single sensor reading, or metric, in each message sent. An example of the format of a message in SSS is:

```
{
  "id": "/",
  "type": "object",
  "properties": {
    "account": {
      "id": "account",
      "type": "string"
    },
    "timestamp": {
      "id": "timestamp",
      "type": "string"
    },
    "sender": {
      "id": "sender",
      "type": "string"
    },
    "msg_type": {
      "id": "msg_type",
      "type": "string"
    },
    "sensor_source": {
      "id": "sensor_source",
      "type": "string"
    },
    "metric_name": {
      "id": "metric_name",
      "type": "string"
    },
    "metric_timestamp": {
      "id": "metric_timestamp",
      "type": "string"
    },
    "metric_value": {
      "id": "metric_value",
      "type": "string"
    }
  }
}
```

As can be seen, a significant amount of overhead information is used for each data point sent. The second schema, SDS, supports multiple sensor readings from a single device in a message. An example of the format for an SDS message is:

```
{
  "id": "/",
  "type": "object",
  "properties": {
    "account": {
      "id": "account",
      "type": "string"
    },
    "timestamp": {
      "id": "timestamp",
      "type": "string"
    },
    "sender": {
      "id": "sender",
      "type": "string"
    },
    "msg_type": {
      "id": "msg_type",
      "type": "string"
    },
    "sensor_source": {
      "id": "sensor_source",
      "type": "string"
    },
    "metrics": {
      "id": "metrics",
      "type": "array",
      "items": {
        "id": "0",
        "type": "object",
        "properties": {
          "name": "[object Object]",
          "sample": {
            "id": "sample",
            "type": "array",
            "items": {
              "id": "0",
              "type": "object",
              "properties": {
                "timestamp": {
                  "id": "timestamp",
                  "type": "string"
                },
                "value": {
                  "id": "value",
                  "type": "number"
                }
              }
            }
          }
        }
      }
    }
  }
}
```

This arrangement is more efficient, as more data points are included for a given amount of overhead information. The MDS 206 schema combines both multiple sensor readings and multiple devices into a single message. Thus, the MDS 206 schema is most efficient in terms of messaging packaging, although it is also the most complex to decode. An example of the MDS is:

```
{
  "id": "/",
  "type": "object",
  "properties": {
    "account": {
      "id": "account",
      "type": "string"
    },
    "timestamp": {
      "id": "timestamp",
      "type": "string"
    },
    "sender": {
      "id": "sender",
      "type": "string"
    },
    "msg_type": {
      "id": "msg_type",
      "type": "string"
    },
    "sensor_source": {
      "id": "sensor_source",
      "type": "array",
      "items": {
        "id": "0",
        "type": "object",
        "properties": {
          "name": "[object Object]",
          "metrics": {
            "id": "metrics",
            "type": "array",
            "items": {
              "id": "0",
              "type": "object",
              "properties": {
                "name": "[object Object]",
                "sample": {
                  "id": "sample",
                  "type": "array",
                  "items": {
                    "id": "0",
                    "type": "object",
                    "properties": {
                      "timestamp": {
                        "id": "timestamp",
                        "type": "string"
                      },
                      "value": {
                        "id": "value",
                        "type": "number"
                      }
                    }
                  }
                }
              }
            }
          }
        }
      }
    }
  }
}
```

To test the improvements provided by using the schemas, an experiment was run using a fixed number of observations encoded using variations in schema and message size. Each experiment was designed to process 480,000 data observations. The number was based on figures from an urban scale, real world deployment of 80,000 sensing devices, each comprising six sensors sending one message per minute. It may be noted that the results scale to larger and smaller deployments. By decreasing the message count and increasing payload size, the desired data observation count for each test run was maintained. The three schemas described above, SSS, SDS, and MDS, were used to construct payloads. The experiments are summarized in Tables 1 to 3 below.

TABLE 1

| SSS Messaging Experiment | | | | |
|---|---|---|---|---|
| payload (kB) | devices | observations | samples | messages |
| 1 | 1 | 1 | 1 | 480000 |

The SDS method dispatched multiple data observations from a single sensing device in payload sizes varying from 1 Kbyte (kB) to 100 kB as shown in Table 2. The approach of the SDS was to maximize the number of observations per sensing device in each message. As shown in the table, this results in a single message of 1 kB size being able to contain two observations per sensor while the 100 kB message can contain 386 observations per sensor.

TABLE 2

| SDS Messaging Experiment | | | | |
|---|---|---|---|---|
| payload (kB) | devices | observations | samples | messages |
| 1 | 1 | 2 | 12 | 40000 |
| 2 | 1 | 6 | 36 | 13338 |
| 3 | 1 | 10 | 60 | 8000 |
| 4 | 1 | 14 | 84 | 5715 |
| 5 | 1 | 16 | 96 | 5000 |
| 10 | 1 | 36 | 216 | 2222 |
| 15 | 1 | 54 | 324 | 1481 |
| 20 | 1 | 73 | 438 | 1096 |
| 50 | 1 | 184 | 1104 | 434 |
| 65 | 1 | 210 | 1260 | 381 |
| 100 | 1 | 386 | 2316 | 207 |

The MDS method used multiple data observations from multiple sensing devices which reside beyond a gateway device or aggregator in sizes varying from 1 kB to 100 kB as shown in Table 3. The MDS method maximized the number of devices beyond the gateway or aggregator. As shown in the table, the 1 kB message supports one sensing device beyond the gateway, while the 100 kB message can support 180 sensing devices per message. As noted, this is based on a constraint of six sensors per sensing device.

TABLE 3

| MDS Messaging | | | | |
|---|---|---|---|---|
| payload (kB) | devices | observations | samples | messages |
| 1 | 1 | 2 | 12 | 40000 |
| 2 | 4 | 1 | 21 | 22858 |
| 3 | 6 | 1 | 30 | 16000 |
| 4 | 7 | 1 | 42 | 11429 |
| 5 | 9 | 1 | 54 | 888 |
| 10 | 18 | 1 | 108 | 444 |
| 15 | 27 | 1 | 162 | 2964 |
| 20 | 36 | 1 | 216 | 2222 |
| 50 | 90 | 1 | 540 | 888 |
| 65 | 102 | 1 | 612 | 784 |
| 100 | 180 | 1 | 1080 | 444 |

Using triggers, such as an increasing backlog of messages at a data source or the detection of congestion in a data sink, the methods described herein may adjust the message schema used to send data from a source to a sink. This may be used to optimize number of data observations being processed by the fog or cloud based backend. As shown in the test results described with respect to FIGS. 3-5, the approach can have a significant impact on the maximum data ingestion rate, for example, a seven-fold improvement in end-to-end performance was seen in the test environment. This is because the additional parsing overhead associated with larger payload sizes is less significant than the increased message volume penalty. As a result, increased traffic or more devices may be supported.

Figure 3:
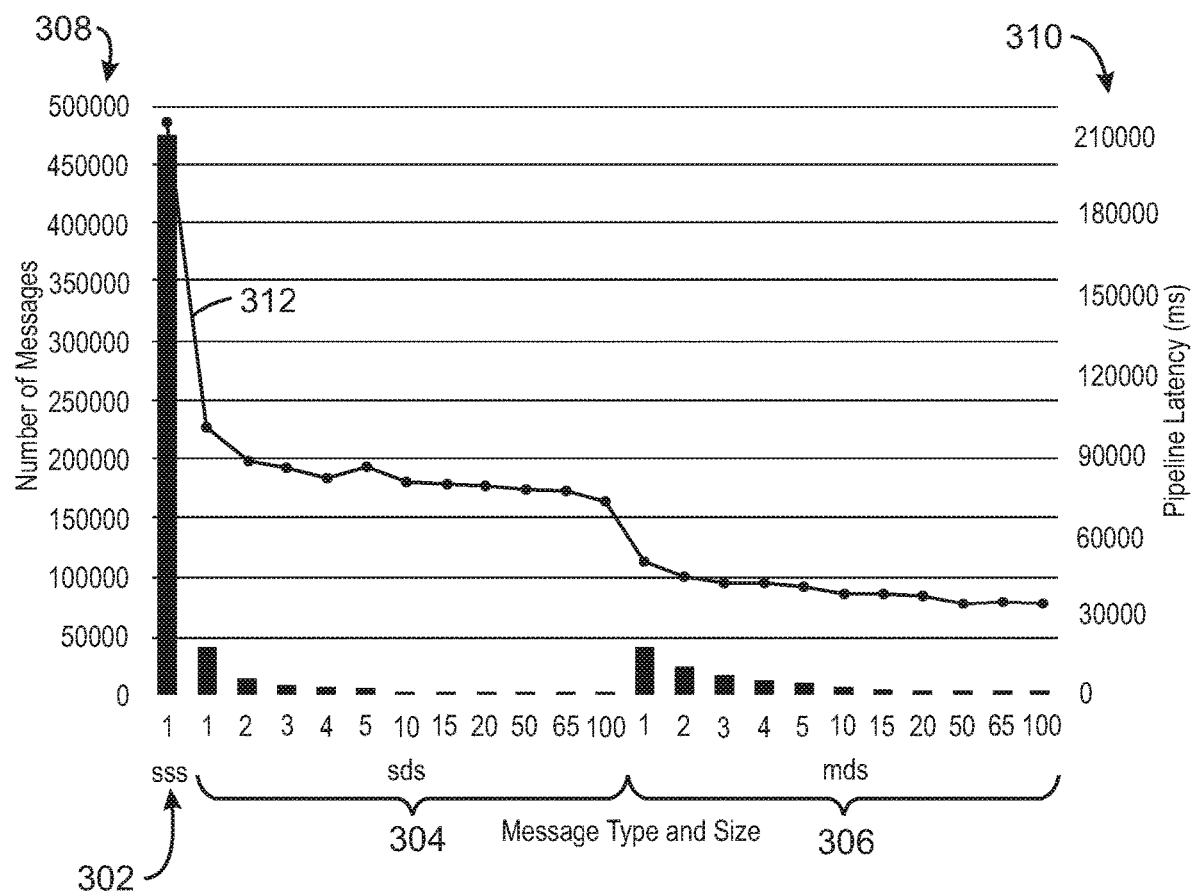
FIG. 3 is a plot of a decrease in latency gained using different message schema SSS, SDS, and MDS.

FIG. 3 is a plot 300 of a decrease in latency gained using different message schema SSS 302, SDS 304, and MDS 306. The number of messages sent is shown against the left axis 308, and the pipeline latency in milliseconds (ms) is shown against the right axis 310.

The pipeline latency 312 shows the overall latency at which the pipeline can process messages for each of the schemas under a fixed load of 480,000 sensor observations. The effect of varying both the schema and the message size may be clearly seen in the plot 300. The use of the more complex schema, and larger messages sizes in each schema, is effective in reducing the total processing time of messages, as indicated by the decrease in the pipeline latency 312. The lower pipeline latency 312 in a congested IoT network may help when a backlog of messages, or a spike in messaging resulting from a sensor event, is to be processed.

Flatter schemas are individually processed more quickly, but this does not offset the penalties due to the message volume being much higher. Although the nested schemas are slower to process individually, as they contain more data, fewer messages are used to transport the same number of observations, and thus, the pipeline latency 312 in the system is lower.

For faster processing, high priority messages, such as congestion messages, may be sent using a streamlined schema, such as SSS 302 to shorten processing time. Low priority messages, such as routine sensor readings, may be queued and packaged into more complex schema at different layers of the edge, to fog, to cloud spectrum.

Figure 4:
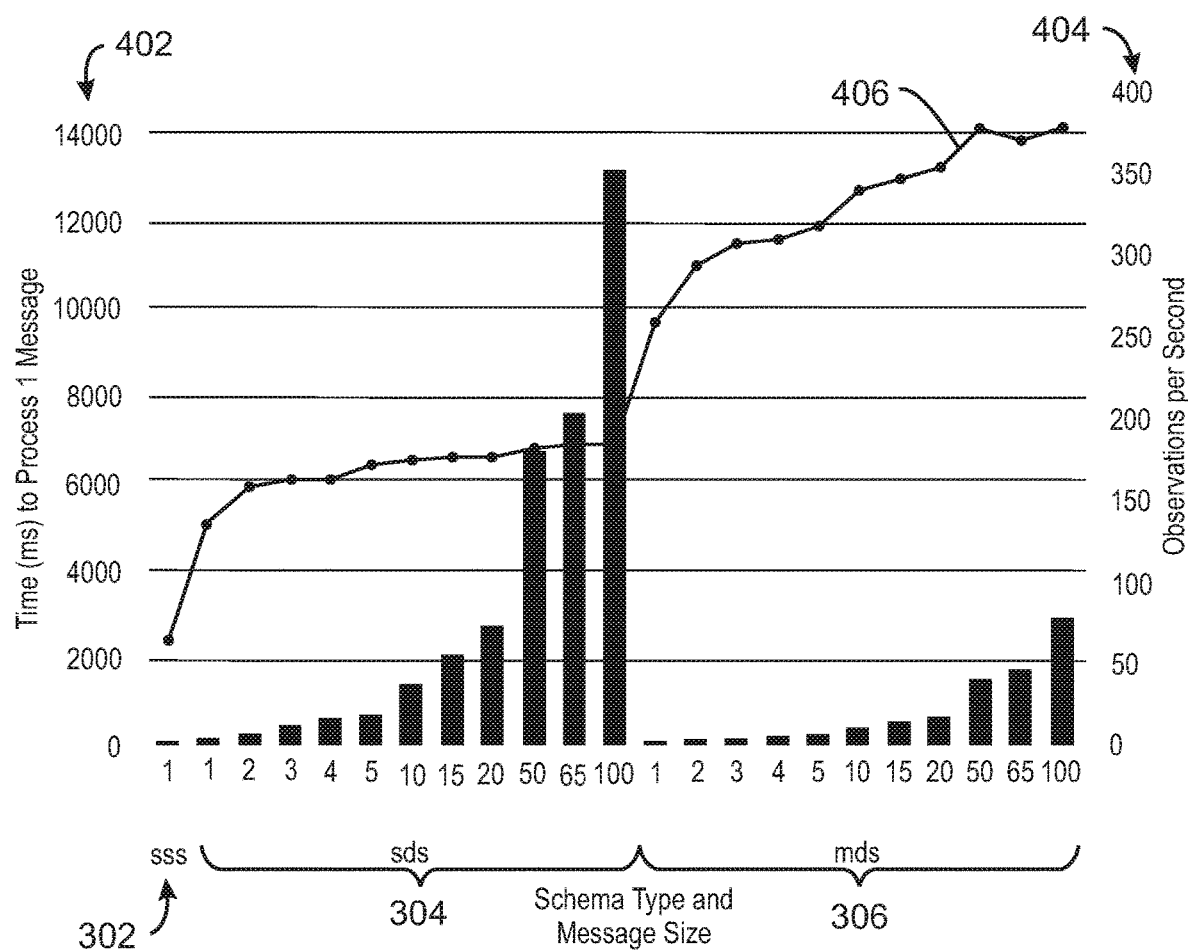
FIG. 4 is a plot of processing time and observations per second versus the message schema and size.

FIG. 4 is a plot 400 of processing time and observations per second versus the message schema and size. Like numbered items are as described with respect to FIG. 3. The left axis 402 is the time to process each individual message, shown as the heights of the bars, while the right axis 404 is the total number of observations per second that can be process by a back-end system, shown as the line. The plot 400 shows the speed at which a backend system may ingest individual data observations.

Although the time to process each individual message increases as the messages become more complex, as indicated by the bars, the number of observations per second 406 that can be processed increases. A seven-fold improvement in throughput may be obtained by using the more complex schema. This creates an IoT network which is much more tolerant to device growth and event storms.

Figure 5:
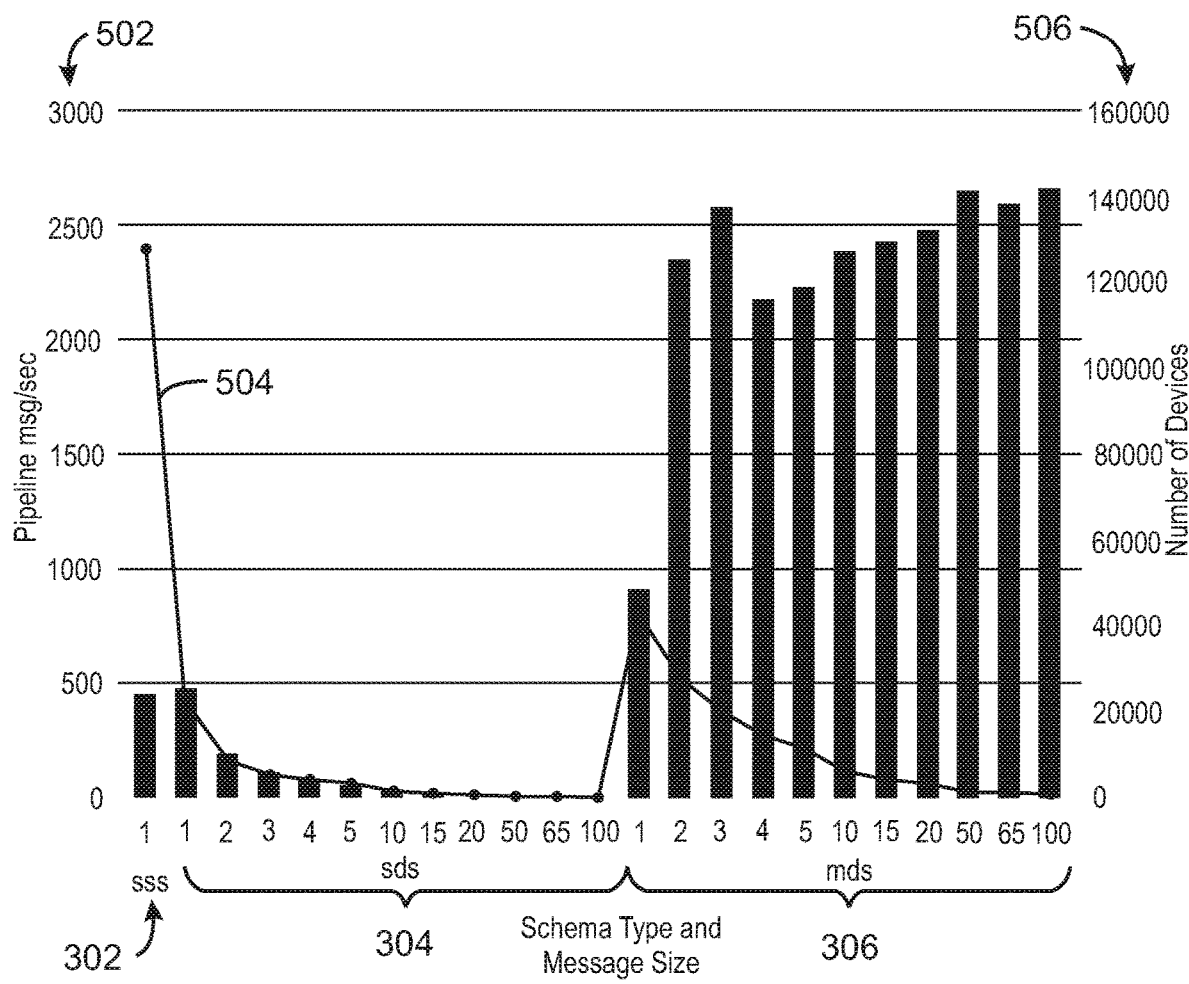
FIG. 5 is a plot of number of messages per second for different schema.

FIG. 5 is a plot 500 of number of messages per second for different schema. Like numbered items are as described with respect to FIG. 2. The left axis 502 represents the number of messages per second 504. The right axis 506 represents the number of devices on the network, show as the bars. This is an example of a network in which messages are periodically sent. In this network test, each sensor source sends a message once per minute with six data observations.

As can be seen, the number of devices which can be supported before congestion begins to occur on the back end has significant variation, for example, up to a seven-fold change in these tests, depending on the schema. Accordingly, the techniques described herein increase the capability to respond to growth by changing schema and message size dynamically, for example, instead of adding more back end capacity, resulting in a more efficient IoT network deployment. As a result, an IoT network with the ability to adjust message schema can support a significant increase in the number of deployed devices without needing to scale the backend.

It can be noted that the schema used is inside of the headers and footers used to package data into packets by various communications protocols. Thus, as noted herein, the schema selection may provide the efficiency improvements for any protocol that may be used.

As described herein, the changes in message schema and size may be used in an orchestrated system, for example, which use a message from a data sink to inform a data source of congestion. The calculation of the rates used may be shown as the procedure below. The procedure is further detailed by the methods 600 and 700 described with respect to FIGS. 6 and 7, respectively.

```
procedure CALCULATERATE(C_rate, C_threshold)
    if C_rate > C_threshold then
        C' = (C_rate(t) - C_rate(t - 1))/C_rate(t - 1)
        where 0 ≤ c_rate < 1
    if C' > C'_threshold then
        C' = (C_rate(t) - C_rate(t - 1))/C_rate(t - 1)
        O' = (O_rate(t) - O_rate(t - 1))/O_rate(t - 1)
        if O' > O'_threshold then
            Dispatch O' message to devices
            return
        end if
    end if
    else
        No action required
    end if
    return C'
end procedure
```

In this algorithm, for all variables, (t) represents the value at the current time, while (t−1) denotes the previous value and (t+1) denotes the next value to use. $C_{rate}$ is the congestion rate in the network. The number ranges from 0 to 1, where 0 denotes no congestion and 1 denotes service unavailability, for example, congestion at such a high rate that it is acting as a denial-of-service. $C_{rate}$ may be determined using any number of techniques.

For example, IoT devices may send out tracer messages to a plurality of devices. The time differences between the tracer messages and the responses received from the plurality of devices may be used to determine conditions in the cloud. A congestion message including a value for $C_{rate}$ may be created and sent to an IoT device to report network conditions for adjustments of the message schema and size. As a further example, the value for $C_{rate}$ may be set as a lower value of a throughput congestion level, tc, or a buffer congestion level, bc. The tc may be calculated for a data sink as a ratio of a current time for a response divided by a baseline time for the response from the component.

The bc may be calculated from an amount of free disk space, a message rate, a size of messages, or a number of seconds required to fill a buffer, or any combinations thereof. For example, bc may be calculated by calculating the number of seconds, n, required to fill a buffer using the following equation:

$$n_s = \frac{d_f}{m_k} \cdot \frac{m_s}{60}.$$

In this equation, $d_f$ is a current free disk space total in kB, $m_k$, denotes an average message size in kB, and $m_s$, denotes a current message per second rate as determined from a data processing pipeline. In this example, the buffer congestion level, bc[n], may be calculated using the following equation:

$$bc[n] = \begin{cases} 1, & \text{if } dp \geq p_{thresh} \\ bc_n, & \text{if } dp \leq p_{thresh} \end{cases}.$$

In this equation, dp denotes a free disk space percentage on the receiving component, $p_{thresh}$ is a configurable free disk space threshold, e.g. 50%, and $bc_n$ is calculated using the following equation:

$$bc_n = \frac{n_s}{n_{max}},$$

wherein $$n_{max} = \frac{d_{max}}{m_k} \cdot \frac{m_s}{60}.$$

and $d_{max}$ denotes the maximum disk space available to the system. The congestion rate, $C_{rate}$, may be set to a lowest value determined for a component in a data processing pipeline, for example, on a per-route basis.

$C_{threshold}$ is the congestion threshold, a variable below which other methods may be employed to manage traffic across the IoT network. The congestion threshold may be set statically or dynamically, for example, being periodically updated from a central location. The congestion threshold may be set on a per-device or per-route basis. For example, where an IoT network has a tree and branch structure, each branch is a different route with different numbers of leaf devices, or, more simply, data coming from a specific source node. Learning algorithms could also be used to set this threshold.

C' is the delta between the last two congestion rates. This value is calculated as $(C_{rate}(t)-C_{rate}(t-1))/C_{rate}(t-1)$. This produces a negative number if $C_{rate}$ is decreasing and a positive number if $C_{rate}$ is rising.

$C'_{threshold}$ is an optional congestion rate threshold for C' above which action may be taken in the IoT network. As for $C_{threshold}$, it may be set statically or dynamically, and may be set on a per-device basis or per-route basis. Learning algorithms could also be used to set this threshold.

$O_{rate}$ is the measured observation rate at which individual observations are being processed at the aggregation points. This is a simple calculation of the number of individual data observations processed in a configurable length, sliding time window. A typical window would be 60 seconds and rate would be expressed as "observations/sec" for such a window.

$O_{threshold}$ is an optional observation threshold for $O_{rate}$ above which messages start to queue, as detected by an increase in $C_{rate}$, and below which the pipeline is processing messages without any queuing, detected as $C_{rate}=0$, or with a reducing queue, detected as a decrease in $C_{rate}$. $O_{threshold}$ may be set statically or dynamically in the same ways as $C_{threshold}$.

O' is the delta between the current and previous observation rates. O' is calculated as $(O_{rate}(t)-O_{rate}(t-1)) O_{rate}(t-1)$. This produces a negative number if $O_{rate}$ is decreasing and a positive number if $O_{rate}$ is rising.

$S_{1-n}$ is an indicator of which schema 1 to n, is to be used. A pre-defined list of schemas, such as the SSS, SDS, and MDS described herein, may be used. Further, the schemas may be in a dynamically updated list maintained by the IoT network administrators.

$M_{size}$ is the message size in bytes which an IoT network component will use when sending messages. $M_{size\_threshold}$ is an optional threshold for message size changes below which any changes to the messaging profile of the sending device is negligible. The value for $M_{size\_threshold}$ may be set statically or dynamically in the same ways as $C_{threshold}$.

$M_{size\_max}(S_{1-n})$ and $M_{size\_min}(S_{1-n})$ are the max and minimum sizes that a message is allowed to grow to for the specified schema, S. The same range can apply to all schemas, or can be set on a per-schema basis.

$M'_{size}$ is the delta between the current message size which a device in the IoT network is using and its previous value, calculated as: $(M_{size}(t)-M_{size}(t-1))/M_{size}(t-1)$. This produces a negative number if $M_{size}$ is decreasing and a positive number if $M_{size}$ is rising.

FIG. 6 is a process flow diagram of a method 600 for orchestrating message schema. The method 600 may be implemented by the system described with respect to FIG. 8. The method 600 starts at block 602 when data is to be sent to downstream devices. At block 604, $C_{rate}(t)$ is determined for a data sink, for example, in a downstream device, and sent to the IoT device in an orchestration message.

At block 606, a determination is made as to whether the current rate of congestion across the sink IoT network component, $C_{rate}(t)$, is greater than the congestion threshold, $C_{threshold}$, for that component. If the congestion rate is below the threshold, then process flow returns to block 602. If the congestion rate is above the threshold, then process flow proceeds to block 608.

At block 608, the change, C', between the current congestion rate and the previous congestion rate is calculated. At block 610, a determine is made as to whether the difference is greater than $C'_{threshold}$. If not, process flow returns to block 602. If so, process flow proceeds to block 612.

At bloc 612, the current rate at which observations are being processed, $O_{rate}(t)$, is calculated. At block 614, the delta, O', between the current and previous observation rates is calculated. At block 616, a determination is made as to whether the delta, O', between the current rate of data observations, $O_{rate}(t)$, and the previous one, $O_{rate}(t-1)$, is greater than the $O_{threshold}$. If not, process flow returns to block 602.

If, at block 616, O' is greater than $O_{threshold}$, at block 618, an orchestration message containing the value of O' is sent to the upstream IoT network devices which are designated as source nodes from the perspective of the sink node. This dynamic queuing and message aggregation at each level of the IoT network which is one of our invention claims. Once the message is sent, the schema and message sizes may be determined, as described with respect to FIG. 7.

FIG. 7 is a process flow diagram of a method 700 for determining schema and message size at a source node. The method 700 may be implemented by the system described with respect to FIG. 8. The method 700 starts at block 702 when the source node receives the O' message described with respect to FIG. 6. The source node may the determine if action is needed based on the value of O' in the actuation message.

At block 704, a new message size, $M_{size}(t+1)$, is calculated. For example, the current message size may be multiplied by the rate of change in observations hitting the sink node: $M_{size}(t+1)=M_{size}(t)*O'$. At block 706, the delta, $M'_{size}$, between the current message size and the new message size (Msize(t+1)) may be calculated as described herein. At block 708, a determination is made as to whether $M'_{size}$ is M larger than a threshold, $M_{size\_threshold}$.

If so, at block 710, a determination is made as to whether a new schema is needed. The determination may be performed by comparing the current message size and schema to message size limits for particular schema. For example, if the new message size, $M_{size}(t+1)$, is larger than the maximum allowed message size, $M_{size\_max}(S_{1-n})$, for the current schema or if the new message size is smaller than the minimum allowed message size for the current schema, $M_{size\_min}(S_{1-n})$, then a new schema will be selected. Process flow proceeds to block 712 to select the schema.

At block 712, a new schema, $S_{1-n}(t+1)$, is chosen by the source device. The new schema may be statically set, selected based on a dynamic set of rules, or selected based on a model from a learning algorithm. In one example, the new schema may be selected by comparing latency information to information in a lookup table, such as the information in Table 4.

TABLE 4

Latency measurements for various message size and Schema.

| Schema | $M_{size}$ | Latency for 1 msg (ms) | $O_{rate}$ | Schema | $M_{size}$ | Latency for 1 msg (ms) | $O_{rate}$ |
|---|---|---|---|---|---|---|---|
| SDS | 1 | 2.51 | 4788.09 | MDS | 1 | 1.25 | 9570.36 |
| | 2 | 6.54 | 5503.83 | | 2 | 1.94 | 10845.23 |
| | 3 | 10.59 | 5664.39 | | 3 | 2.64 | 11355.27 |
| | 4 | 14.32 | 5658.24 | | 4 | 3.66 | 11469.91 |
| | 5 | 17.11 | 5945.26 | | 5 | 4.58 | 11786.19 |
| | 10 | 35.93 | 6014.48 | | 10 | 8.55 | 12625.19 |
| | 15 | 53.41 | 6064.48 | | 15 | 12.52 | 12942.51 |
| | 20 | 71.92 | 6083.86 | | 20 | 16.34 | 13225.22 |
| | 50 | 178.12 | 6215.99 | | 50 | 38.43 | 14036.52 |
| | 65 | 201.12 | 6325.54 | | 65 | 44.5 | 13758.33 |
| | 100 | 349.35 | 6278.04 | | 100 | 76.66 | 14040.19 |
| | mean | 85.54 | 5867.49 | | mean | 19.19 | 12332.27 |
| SSS | 1 | 0.45 | 2225.94 | | | | | |

At block 714, the message size to use for the new schema is calculated. This may be based on the value of O' such that, in a congested IoT network, the new $O_{rate}$ will be higher than the old one or, in an uncongested IoT network, the new $O_{rate}$ will be lower than the old one in the sink device. The new message size may be set statically using a table, such as Table 4, calculated dynamically, or selected based on a model from a learning algorithm.

Once the schema and message size have been determined, at block 716, the source sends messages using the schema and message size. If the schema was not changed, as determined at block 708, the previous schema and size are used. If a new schema and size have been selected, the source node adjusts the current message size, $M_{size}(t)$, to match the desired message size, $M_{size}(t+1)$. Accordingly, the source node aggregates incoming messages from its source devices, or observations from sensors, until the message size criteria is met. This effectively implements a dynamic micro-buffer in the source device.

FIG. 8 is a block diagram of components that may be present in an IoT device 800 to control message schema selection. Like numbered items are as described with respect to FIGS. 1A and 1B. The IoT device 800 may include any combinations of the components. The components may be implemented as ICs, portions thereof, discrete electronic devices, or other modules, logic, hardware, software, firmware, or a combination thereof adapted in the IoT device 800, or as components otherwise incorporated within a chassis of a larger system. The block diagram of FIG. 8 is intended to show a high level view of components of the IoT device 800. However, some of the components shown may be omitted, additional components may be present, and different arrangements of the components shown may occur in other implementations. The IoT device 800 may be a traffic monitoring device, a remote weather station, a programmable logic controller (PLC) or remote terminal unit (RTU) in a SCADA (supervisory control and data acquisition) network, an alarm system device, a smart television, a cellular telephone, or any number of other IoT devices as discussed with respect to FIG. 1.

As seen in FIG. 8, the IoT device 800 may include a processor 802, which may be a microprocessor, a multi-core processor, a multithreaded processor, an ultra-low voltage processor, an embedded processor, or other known processing element. The processor 802 may be a part of a system on a chip (SoC) in which the processor 802 and other components are formed into a single integrated circuit, a single package, or a single circuit board. As an example, the processor 802 may include an Intel® Architecture Core™ based processor, such as a Quark™, an Atom™, an i3, an i5, an i7, or MCU-class processors, or another such processor available from Intel® Corporation, Santa Clara, Calif. However, other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. These processors may include units such as an Ax-series processor from Apple® Inc., a Snapdragon™ processor from Qualcomm® Technologies, Inc., or an OMAP™ processor from Texas Instruments, Inc.

The processor 802 may communicate with a system memory 804. Any number of memory devices may be used to provide for a given amount of system memory. For example, the memory for smaller devices may include memory regions formed in a processor chip, such as register sets, among others. In these devices, the memory may be between about 32 kB and about 512 kB, or larger.

In other examples, the memory may be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data, applications, operating systems and so forth, a mass storage 806 may also couple to the processor 802. The mass storage 806 may be a flash memory, or other programmable memory, incorporated into a processor, such as an MCU, Quark, and the like, or built into an SoC system. In some examples, the mass storage 806 may be implemented via a solid state disk drive (SSDD). However, the mass storage 806 may be implemented using a micro hard disk drive (HDD) in some IoT devices 800. Further, any number of new technologies may be used for the mass storage 806 in addition to, or instead of, the technologies described, such resistance change memories, phase change memories, holographic memories, or chemical memories, among others. For example, the IoT device 800 may incorporate the 3D XPOINT memories from Intel® and Micron®.

The components may communicate over a bus 808. The bus 808 may include any number of technologies, including industry standard architecture (ISA), extended ISA (EISA), peripheral component interconnect (PCI), peripheral component interconnect extended (PCIx), PCI express (PCIe), or any number of other technologies. The bus 808 may be a proprietary bus, for example, used in a SoC based system. Other bus systems may be used, such as the I²C interface, the SPI interfaces, and point to point interconnections, among others.

The bus 808 may couple the processor 802 to an interface 810 that is used to connect external devices. The external devices may include sensors 812, such as traffic sensors, radar speed detectors, cameras, flow sensors, temperature sensors, motion sensors, wind speed sensors, pressure sensors, barometric pressure sensors, and the like. The interface 810 may be used to connect the IoT device 800 to actuators 814, such as traffic lights, strobe lights, valve actuators, lock solenoids, audible sound generators, visual warning devices, and the like. In some examples, such as aggregators and gateways, the interface 810, sensors 812, and actuators 814 may not be present.

While not shown, various input/output (I/O) devices may be present within, or connected to, the IoT device 800. For example, a display may be included to show information, such as sensor readings or actuator position. An input device, such as a touch screen or keypad may be included to accept input.

The IoT device 800 can communicate with a cloud 102 in a variety of manners. For example, the IoT device 800 may include a network interface controller (NIC) 816 to communicate with the cloud 102 through an Ethernet interface. This may include communicating through a small wired or wireless network shared by number of fog devices 122 that communicate with the cloud 102 through an IoT gateway 110, as described with respect to FIG. 1. For example, the IoT device 800 may be part of an ad-hoc or mesh network in which a number of devices pass communications directly between each other, for example, following the optimized link state routing (OLSR) protocol, the better approach to mobile ad-hoc networking (B.A.T.M.A.N.) protocol, the OIC protocol, or the ONVIF protocol, among others. The mesh network may communicate with the cloud, for example, through an IoT gateway 110.

A radio transceiver 818 that may include various wireless modules, each of which can correspond to a radio configured for a particular wireless communication protocol, may be used to communicate with IoT devices in a fog 122. For example, the radio transceiver 818 may include a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, can occur via an included WWAN unit. The IoT device 800 is not limited to these types of radio transceivers, but may include any number of other radio communications equipment, such as transceivers compatible with the Bluetooth® standard as defined by the Bluetooth® Special Interest Group. For example, the IoT device 800 may communicate over a wireless personal area network (WPAN) according to the IEEE 802.15.4 standard, such as a LoRaWAN transceiver, among others.

In various examples, the communication devices, including the radio transceiver 818 or the NIC 816, or both, may be used to communicate with devices in the fog 122. Similarly, either of the communication devices may be used to communicate with devices in the cloud 102.

A battery 820 may power the IoT device 800, although in examples in which the IoT device 800 is mounted in a fixed location, it may have a power supply coupled to an electrical grid. The battery 820 may be a lithium ion battery, a metal-air battery, such as a zinc-air battery, an aluminum-air battery, a lithium-air battery, and the like.

A battery monitor/charger 822 may be included in the IoT device 800 to track the state of charge (SoCh) of the battery 820. The battery monitor/charger 822 may be used to monitor other parameters of the battery 820 to provide failure predictions, such as the state of health (SoH) and the state of function (SoF) of the battery 820. The battery monitor/charger 822 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 822 may communicate the information on the battery 820 to the processor 802 over the bus 808.

A power block 824, or other power supply coupled to a grid, may be coupled with the battery monitor/charger 822 to charge the battery 820. In some examples, the power block 824 may be replaced with a wireless power receiver to obtain the power wirelessly, for example, through a loop antenna in the IoT device 800. A battery charging circuit, such as an LTC4020 chip from Linear Technologies of Milpitas, Calif., among others, may be included in the battery monitor/charger 822. The specific charging circuits chosen depend on the size of the battery 820, and thus, the current required. The charging may be performed using the Airfuel standard promulgated by the Airfuel Alliance, the Qi wireless charging standard promulgated by the Wireless Power Consortium, the Rezence charging standard, promulgated by the Alliance for Wireless Power, among others.

The mass storage 806 may include a number of modules to implement the schema control described herein. Although shown as software modules, the modules may be implemented as hardware blocks, for example, in a dedicated application specific integrated circuit (ASIC) included in the IoT device 800. The modules may include a congestion monitor 826 that sends tracer messages to downstream devices to determine the current network congestion rate. The congestion monitor may also receive congestion messages from downstream devices, wherein the congestion messages include a congestion rate for a data sink.

An orchestration controller 828 may use the congestion rates received from a downstream device, for example, determined in the IoT device 800 or received from other devices, to determine whether to send orchestration messages to upstream devices. The determination may be performed by the techniques described with respect to FIGS. 6 and 7.

The orchestration controller 828 may also receive orchestration messages from downstream devices indicating that the rate of processed observations has changed. If so, the orchestration controller 828 may direct a schema selector 830 to select a new message size, and, if needed, a new schema, for a message dispatcher 832. If not, the orchestration controller 828 may direct the message dispatcher to continue using the current schema and message size.

The message dispatcher 832 may use the selected schema and message size to package data held in a data store 834 into aggregated data messages. The aggregated data messages may then be dispatched to devices, for example, through the NIC 816 to the cloud 102.

The IoT device 800 is not limited to the units shown, since other units may be present. For example, a data backlog transfer controller may be used to transfer messages that have built up in the data store 834 during a network capacity issue. For example, instead of trying to send backlogged messages immediately upon restoration of communications, the data backlog transfer controller may incrementally send the messages using a number of algorithms. These may include a last in-first out (LIFO) algorithm, a first in-first out (FIFO) algorithm, or a random sampling algorithm. Further, the data backlog transfer controller can be augmented to prioritize messages with higher entropy. Entropy may include the most recent observations being deemed more valuable than older ones. Further, the mass storage 806 may include modules to perform the method 900 of FIG. 9, creating a hybrid device. For example, the mass storage 806 may include the modules described with respect to FIG. 11, such as a traffic monitor 1102, a cost function calculator 1104, a schema manager 1106, and a schema dispatcher 1108, among others.

The control of message schema and size is not limited to devices that use an orchestration, for example, based on congestion messages, to determine schema. As described herein, the message schema and size may be selected in a closed loop system, in which a data source uses a cost function to determine an optimum schema and size. This dynamic control is discussed further with respect to FIG. 9.

Figure 9:
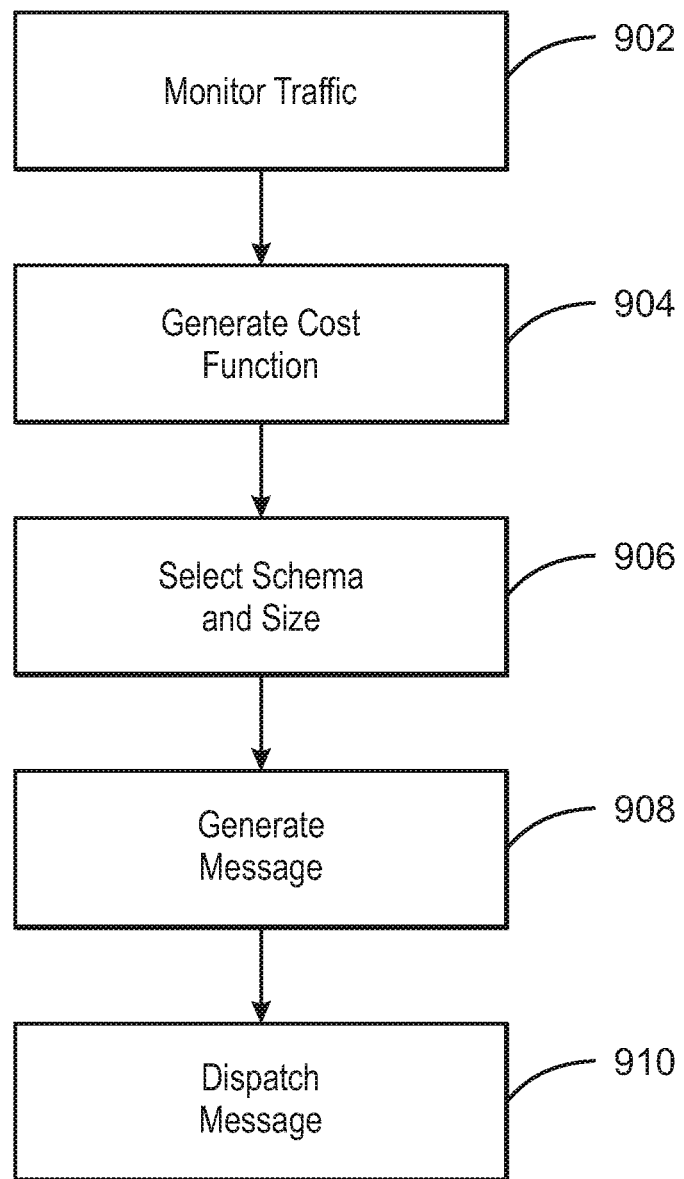
FIG. 9 is a block diagram of a method that may be used for dynamic control of message schema.

FIG. 9 is a block diagram of a method 900 that may be used for dynamic control of message schema. The method 900 may be implemented by the system described with respect to FIG. 11. The method 900 begins at block 902, with the observation of the network data flow to determine per-device inbound traffic loads.

At 904, a cost function is generated and used to select a message schema and size. A number of factors may be considered when deciding what schema to use. As described herein, the cost function may account for what is being sent as well as the traffic being received. This enables patterns to be identified locally by the sending node.

At block 906, the schema is selected, and the size is determined. This may include not changing a current schema or message size. At block 908, the message is generated using the selected schema and message size.

At block 910, the message is dispatched onto the network. The cost function parameters may be updated using the message dispatch, for example, sending time, transit time, or the like, creating a feedback loop.

Implementing a closed loop system on devices in an IoT network, allows the devices to keep track of their own ingress and egress traffic. Using the closed loop system, devices automatically adjust the message schema used to send data from a data source, such as a sensor, to a data sink, such as a fog node, a gateway, devices in the cloud, and the like. The data source can then optimize the rate at which data observations are sent to the fog or cloud based back end for processing.

The data flow on each device is observed to determine traffic state values from inbound traffic on a per device basis. A number of factors are considered when deciding what to send. The cost function includes what the device is sending as well as the traffic it is receiving at present, and a priority to improve accuracy. The calculation of the rates used may be shown as the procedure below. The procedure is further detailed by method 1000, described with respect to FIG. 10.

```
procedure CALCULATERATE(O_in_rate, O_threshold)
    O' = (O_in_rate(t) − O_in_rate(t − 1))/O_in_rate(t − 1)
    if O' > O'_threshold then
        Cost_S_1-n(t) = (O_ in_rate) * (L_ S_1-nM_Size)
        for n = 1; n < max.no. of schemas; n++ do
            if (O_threshold > O_ in_rate) then
                Cost_ S_1-n(t + 1) = O_ in_rate * L_S_1-nM-Size
            else (O_threshold < O_in_rate)
                Cost_ S_1-n(t + 1) = O_in_rate * L_ S_1-nM-Size
        end if end for
    end if
        if Cost _S_1-n(t + 1) < Cost_S_1-n(t) then return
            Cost_ S_1-n(t + 1)
        else
            return Cost_S_1-n(t)
    end if
end procedure
```

For all variables, (t) denotes the value at the current time, while (t−1) denotes the previous value, and (t+1) denotes the next value to use. $O\_in_{rate}$ is the rate at which individual observations for inbound data are arriving at a device in the network. This is a calculation of the number of individual data observations processed in a configurable sliding time window. For example, a window may be a 60 second period, and the $O\_in_{rate}$ would be expressed as "observations/sec" for such a window.

$O\_in'$ is the delta between the current and previous observation rates for inbound traffic, is calculated as $O\_in_{rate}(t) - O\_in_{rate}(t-1))/O\_in_{rate}(t-1)$. This produces a negative number if $O\_in_{rate}$ is decreasing and a positive number if $O\_in_{rate}$ is rising.

$O\_in'_{threshold}$ is an optional threshold below which no action is taken. The threshold may be set statically or dynamically, for example, periodically updated from a central location. Further, the threshold may be set on a per-device basis or a per-route basis, where if an IoT network has a tree and branch structure, each branch is a different route with different numbers of leaf nodes. Machine learning algorithms may be used to set the threshold.

$O_{permsg}$ is the observations per message. This is an average of the number of data observations in a message, but may be broken out by schema and message size as shown Table 4.

$O_{threshold}$ is the maximum through put which the device can support for a given schema and message size. This is an average value which may change over time and is set by monitoring the traffic flow, for example, as described with respect to FIG. 9. It may be initially set to a static value.

$S_{1-n}$ is a list of 1 to n schemas. The list may be predefined or may be a dynamically updated list maintained by the IoT network administrators. The schemas described with respect to FIG. 2, SSS, SDS, and MDS, may be used. The message sizes may range from 1 kb to 100 kb.

$M_{size}$ is the message size in bytes which an IoT network component will use when sending messages. $M_{size\_max}(S_{1-n})$ and $M_{size\_min}(S_{1-n})$ are the maximum threshold and the minimum threshold, respectively, for a message for the specified schema, $S_{1-n}$. The same ranges may apply to all schemas or may be set on a per-schema basis. The message sizes may be selected from a discrete set of values, such as shown in Table 4, or may be calculated over time as the performance feedback is collected.

$Cost\_S_{1-n}$ is a cost function for using schema 1 to n of size $M_{size}$. The cost function is the average time it takes a sample of observations, $SO_{1-n}$, of the same schema type and message size, to transition through the IoT network device. This includes any penalty of time it may take to repackage data from one schema type to another. It is defined as:

$$1/n \sum_{k=0}^{n} SO_k$$

$L\_S_{1-n}M_{size}$ is the latency (L) for a message using a particular schema, $S_{1-n}$, and a particular message size, $M_{size}$. This is calculated by sampling a selection of messages passing through the IoT network device.

Figure 10:
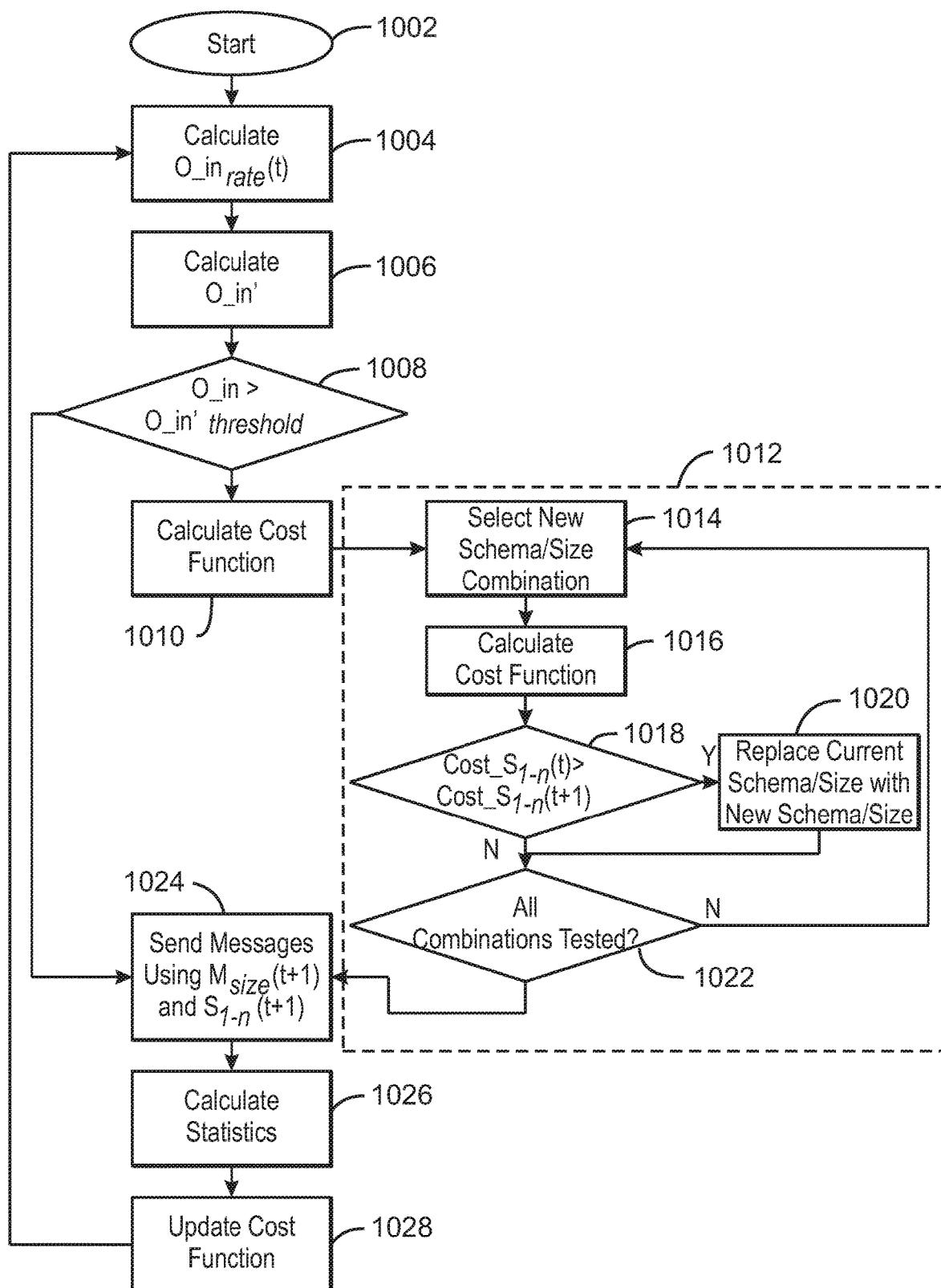
FIG. 10 is a block diagram of a method for dynamically controlling message schema and size in a data source.

FIG. 10 is a block diagram of a method 1000 for dynamically controlling message schema and size in a data source. The method 1000 may be implemented by the system described with respect to FIG. 11. The method 1000 begins at block 1002 when the IoT device has data to send to a downstream device.

At block 1004, the current rate at which data observations are arriving at the IoT network device, $O\_in_{rate}(t)$, is calculated. At block 1006, the delta between the current and previous observation rates for inbound traffic, $O\_in'$, is calculated.

At block 1008, a determination is made as to whether the change between the current rate of data observations, $O\_in_{rate}$, and the previous one is greater than the $O'_{threshold}$. This determines whether the load on the device is increasing, $O'>0$, and the load on the device is larger than the maximum supportable throughput average for that schema type and size.

If so, at block 1010, the cost function is calculated to determine if a new schema or message size should be applied. The cost function builds and maintains a model whose values are populated and stored on a per-device basis, as shown in Table 4. The data in the model informs the cost function. The cost of the current schema is determined as $Cost\_S_{1-n}(t)$ is $O\_in_{rate}*L\_s_{1-n}M_{size}$. As described, $L\_s_{1-n}M_{size}$ is the latency cost of the current message volume using the current message schema and size.

If the load on the device is decreasing, $O'<0$, and the load on the device is less than the maximum supportable through put average for that schema type and size, denoted as O threshold, $O\_in_{rate}<O_{threshold}$, then the cost of the current schema, $Cost\_S_{1-n}(t)$, is determined the same way, $O\_in_{rate}*L\_s_{1-n}M_{size}$.

If the $O\_in_{rate}=O_{threshold}$, no change is made in the rate. For example, the cost function would not change from the last iteration, and the same schema and message size would be used. It may be noted that the techniques are not limited to the relationships shown for the thresholds. In some examples, the thresholds may be lower limits or upper limits, and may be set by regulatory issues.

Box 1012 represents a determination as to whether the cost of a new schema or message size is less than the cost of the current schema or message size. The determination is performed by looping through all possible schemas and message sizes that have an O threshold value which can satisfy the current load ($O\_in_{rate}$) to find the least expensive one, for example, with the lowest cost function, as described with respect to blocks 1014 to 1020.

At block 1014, a pointer is incremented to a select a new schema and size combination. At block 1016, the cost function for the new schema and size combination is calculated, for example, if ($O_{threshold} > O\_in_{rate}$) then $Cost\_S_{1-n}(t+1) = (O\_in_{rate} \times L\_S_{1-n}M_{size})$. At block 1018, a determination is made as to whether the new schema and message size has a lower cost, for example, $Cost\_S_{1-n}(t+1) < Cost\_S_{1-n}(t)$. If so, at block 1020, the new schema and message size replaces the current schema and message size, for example, by replacing the value for a current pointer to the schema and message size combination. At block 1022, a determination is made as to whether all schemas and message size combinations have been tested. If not, process flow returns to block 1014.

At block 1024, the message is sent using the selected schema and message size. This may be performed using the current schema and message size combination if no other schema and size combination results in a lower cost. At block 1026, the latency for the current message schema and size, denoted as $L\_S_{1-n}M_{size}$, is sampled to update the statistics, for example, as stored in Table 4. This includes updating the average number of observations contained in a message, denoted as $O_{permsg}$, and the rate of observations being sent by the device, denoted as $O_{threshold}$.

At block 1028, the cost function for the current schema and message size combination may be updated using the latency and other values obtained from sampling the message stream. Process flow then returns to block 1004.

Figure 11:
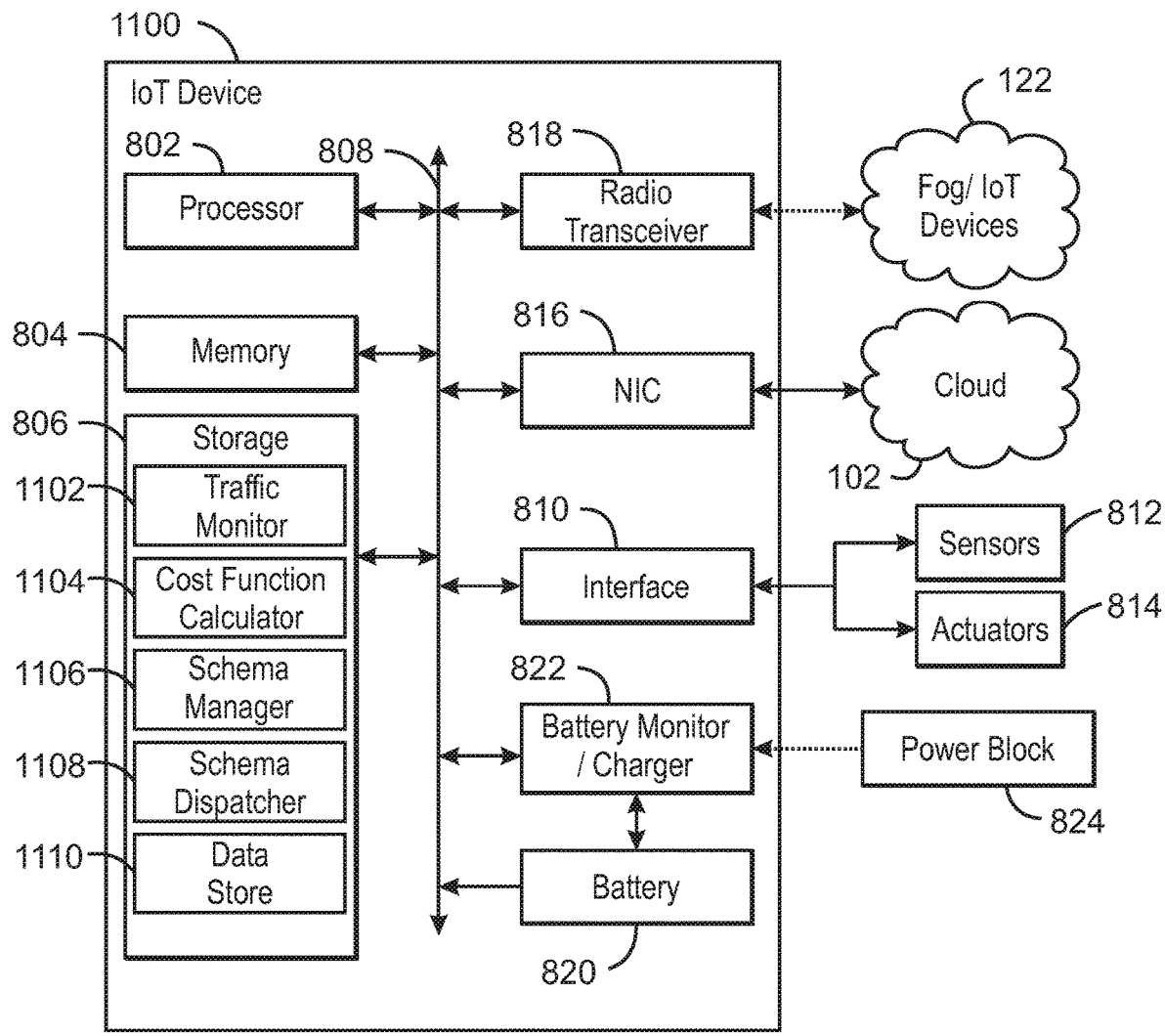
FIG. 11 is a block diagram of a system that may be used for dynamically controlling schema from a sending device.

FIG. 11 is a block diagram of a system 1100 that may be used for dynamically controlling schema from a sending device. Like numbered items are as described with respect to FIGS. 1 and 8. In this example, the mass storage 1106 may include a number of modules to implement the closed loop message schema control, described herein. These modules may include a traffic monitor 1102 to observe data flow on the networks to determine traffic state values from inbound data traffic on a per-device basis.

A cost function calculator 1104 may calculate a cost function for a current schema and message size. Further, the cost function calculator 1104 may iterate through a set of possible schema and message size combinations to determine if a different schema and message size has a lower cost function that the current schema and message size. If so, the cost function calculator 1104 may direct a schema manager 1106 to select a new schema and message size for a schema dispatcher 1108. If not, the cost function calculator 1104 may direct the schema manager 1106 to continue using the current schema and message size.

The schema dispatcher 1108 may use the selected schema to package data held in a data store 1110 into an aggregated data message. The aggregated data message may then be dispatched to devices, for example, through the NIC 1116 to the cloud 102.

The IoT device 1100 is not limited to the units shown, since other units may be present. For example, modules for implementing both an orchestrated schema control system and a closed loop schema control system may be present, forming a hybrid system. For example, the mass storage 806 may include the modules described with respect to FIG. 8, including a congestion monitor 826, an orchestration controller 828, a schema selector 830, and a message dispatcher 832, among others. These modules may allow the IoT device 1100 to perform the methods 600 and 700 described with respect to FIGS. 6 and 7. In this example, the schema control may be adaptive. For example, the IoT device 1100 may use the orchestrated system upon the receipt of congestion messages, and use the closed loop system when network congestion is sensed by the data source.

Other units may also be included, such as a data backlog transfer controller may be used to transfer messages that have built up in the data store 1110 during a network capacity issue. For example, instead of trying to send backlogged messages immediately upon restoration of communications, the data backlog transfer controller may incrementally send the messages using a number of algorithms. These may include a last in-first out (LIFO) algorithm, a first in-first out (FIFO) algorithm, or a random sampling algorithm. Further, the data backlog transfer controller can be augmented to prioritize messages with higher entropy. Entropy may include the most recent observations being deemed more valuable than older ones. The backlogged messages may be sent using the current schema and message size.

Figure 12:
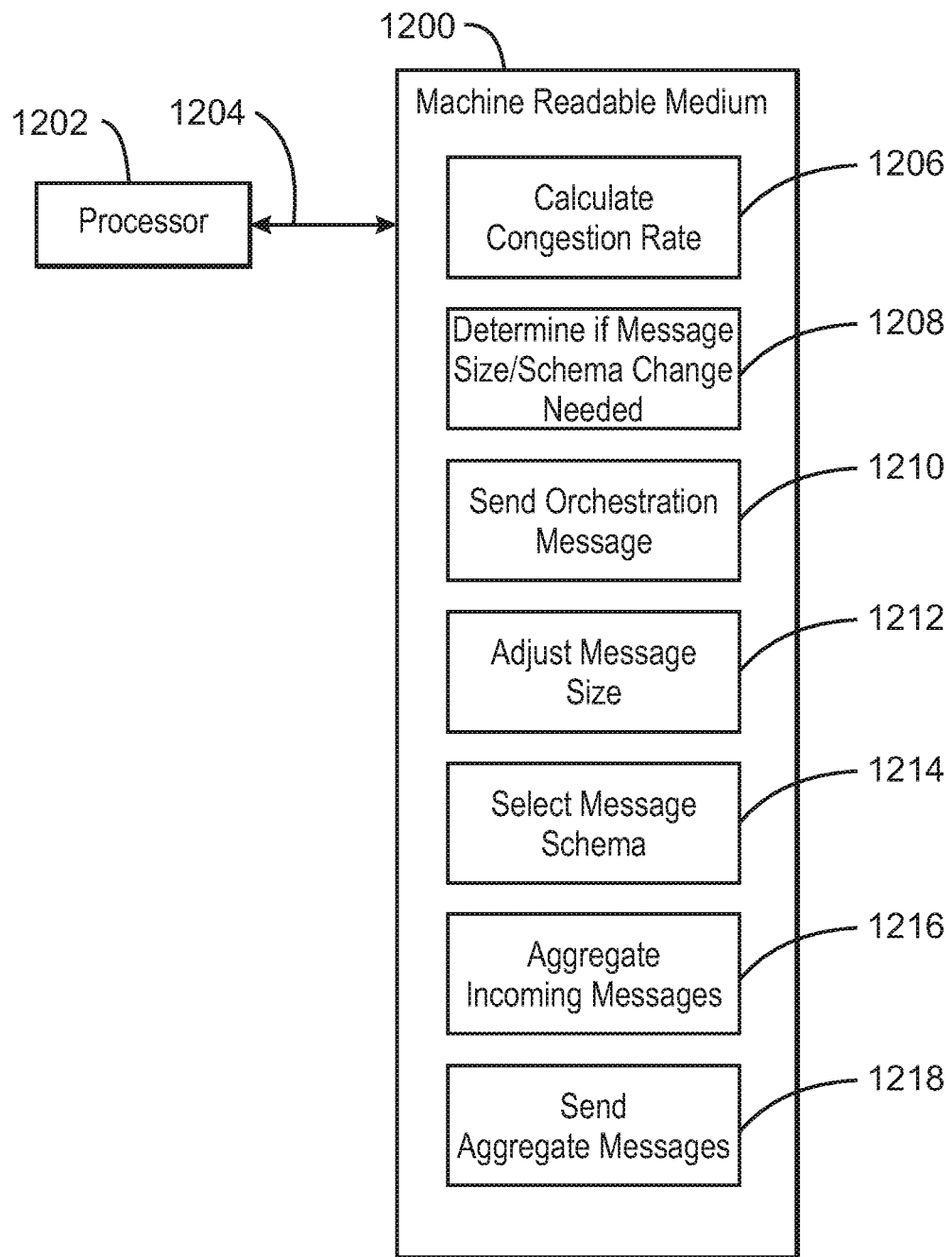
FIG. 12 is a block diagram of a non-transitory, computer readable medium that includes comprising instructions, which when executed, direct a processor to control message schema through orchestration.

FIG. 12 is a block diagram of a non-transitory, computer readable medium 1200 that includes comprising instructions, which when executed, direct a processor 1202 to control message schema through orchestration. The processor 1202 communicates with the non-transitory, computer readable medium 1200 over a bus 1204. The processor 1202 and bus 1204 may be as described with respect to the processor 802 and bus 806 of FIG. 8. The non-transitory, computer readable medium 1200 may include code 1206 to direct the processor 1202 to determine a congestion rate, for example, by sending tracer messages to downstream units, or data sinks, then measuring response times for return messages. The response times may be used to calculate congestion rates. The code block 1206 may direct the processor to send congestion messages including the congestion rate, to upstream devices, or data sources, to allow the upstream devices to determine if changes are needed in message size or schema.

A code block 1208 may be included to direct the processor 1202 to determine if a congestion rate received from a downstream device should cause a change in a message size or schema at an upstream device. This may be performed according to the method 600 described with respect to FIG. 6

A code block 1210 may be included to direct the processor 1202 to send an orchestration message to upstream devices, or data sources, to control their selection of message size and schema. The orchestration message may include a delta between a current rate at which observations are being processed by the data sink, and a previous rate at which observations were being processed by the data sink.

A code block 1212 may be included to direct the processor 1202 to select a new message size. A code block 1214 may also be included to direct the processor 1202 to select a new schema, for example, if the new size is outside of size thresholds for the current schema. The code blocks 1212 and 1214 may use the method 700 described with respect to FIG. 7

A code block 1216 may be included to direct the processor 1202 to aggregate data into messages, for example, based on the message schema and size selected. A code block 1218 may be included to direct the processor 1202 to send the aggregated data messages to a data sink.

The non-transitory, computer readable medium 1200 is not limited to the code blocks 1206-1218 shown, but may include any number of other code blocks to implement functions such as operating systems, data collection, mesh networks, and the like. For example, the non-transitory, computer readable medium 1200 may include the code blocks described with respect to FIG. 13, providing a hybrid system capable of performing both types of control of message schema.

Figure 13:
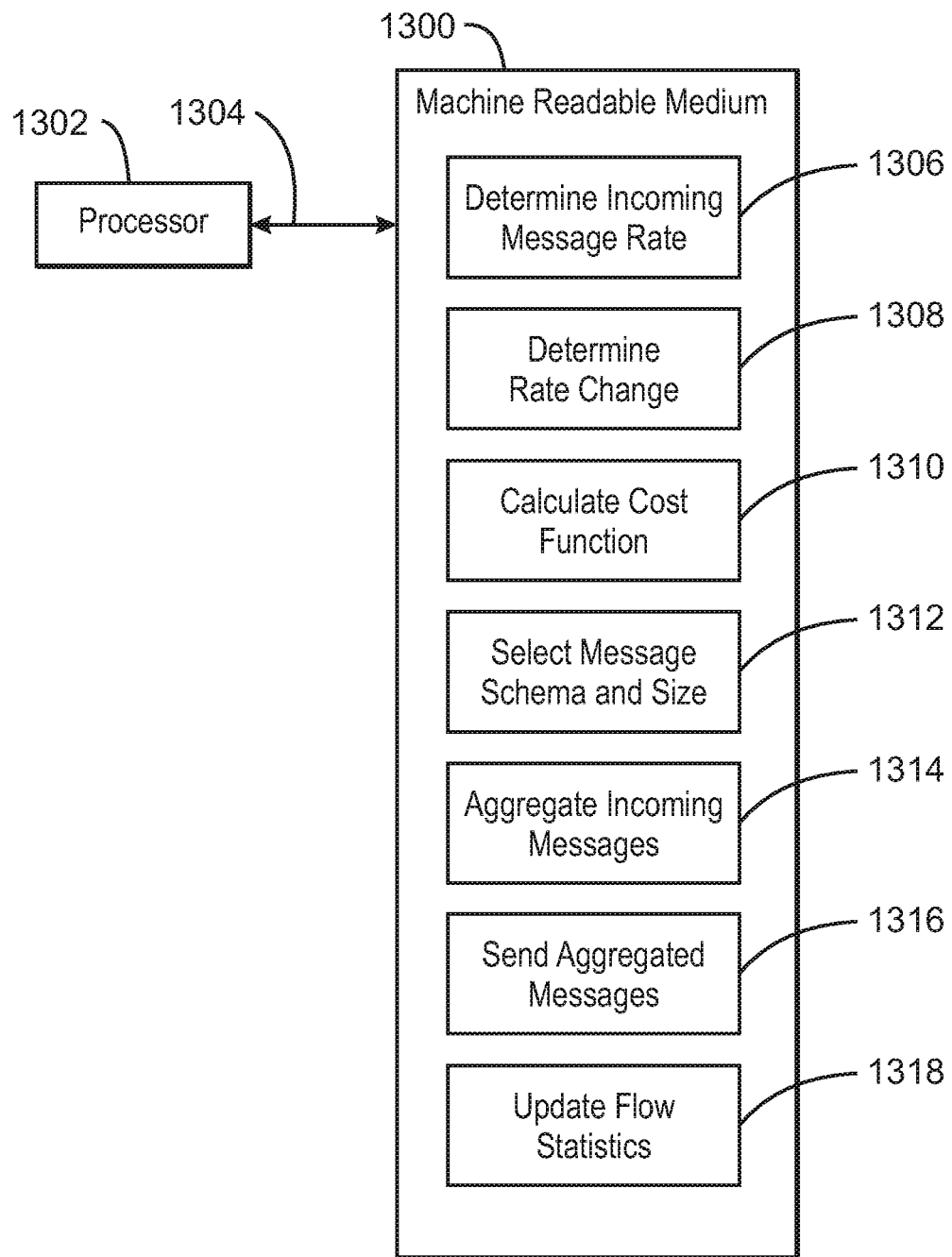
FIG. 13 is a block diagram of a non-transitory, computer readable medium that includes comprising instructions, which when executed, direct a processor to implement a closed loop control of message schema.

FIG. 13 is a block diagram of a non-transitory, computer readable medium 1300 that includes comprising instructions, which when executed, direct a processor 1302 to implement a closed loop control of message schema. The processor 1202 communicates with the non-transitory, computer readable medium 1200 over a bus 1204. The processor 1302 and bus 1304 may be as described with respect to the processor 802 and bus 806 of FIG. 8.

The non-transitory, computer readable medium 1300 may include a code block 1306 to direct the processor to determine an incoming message rate. A code block 1308 may be included to direct the processor 1302 determine a rate change. A code block 1310 may be included to direct the processor 1302 to determine a cost function for a message schema and size. A code block 1312 may be included to direct the processor 1302 to select a message schema and size, for example, by iterating through a number of possible combinations of message schemas and sizes to determine the message schema and size with the lowest cost function for the current conditions. A code block 1314 may be included to direct the processor 1302 to aggregate data into messages, for example, based on the message schema and size selected. A code block 1316 may be included to direct the processor 1302 to send the aggregated messages to a data sink. A code block 1318 may be included to direct the processor 1302 to measure and update flow statistics, for example, by sampling data rates for received and sent messages.

The non-transitory, computer readable medium 1300 is not limited to the code blocks 1306-1318 shown, but may include any number of other code blocks to implement functions such as operating systems, data collection, mesh networks, and the like. For example, the non-transitory, computer readable medium 1300 may include the code blocks described with respect to FIG. 12, providing a hybrid system capable of performing both types of control of message schema.

EXAMPLES

Example 1 provides an apparatus for communicating using a message schema, including an internet-of-things (IoT) device, including a communications device to communicate between the IoT device and other devices. An orchestration controller accepts an orchestration message from a downstream device. A schema selector adjusts a message size based, at least in part, on the orchestration message. A message dispatcher aggregates data into an aggregated data message according to a current schema, and sends the aggregated data message to a data sink.

Example 2 includes the subject matter of example 1. In this example, the schema selector is to select a new message schema if the message size is greater than a maximum threshold for a current message schema, or less than a minimum threshold for the current message schema.

Example 3 includes the subject matter of either of examples 1 or 3. In this example, the message schema includes a single sample schema (SSS), a single device schema (SDS), or a multiple device schema (MDS).

Example 4 includes the subject matter of any of examples 1 to 3. In this example, the communications device includes a radio transceiver, or a network interface controller, or both.

Example 5 includes the subject matter of any of examples 1 to 4. In this example, the apparatus includes a radio transceiver that is compliant with the Institute of Electrical and Electronics Engineers (IEEE) 802.15.4 standard.

Example 6 includes the subject matter of any of examples 1 to 5. In this example, the orchestration message includes a delta between a current rate at which observations are being processed by the data sink, and a previous rate at which observations were being processed by the data sink.

Example 7 includes the subject matter of any of examples 1 to 6. In this example, the apparatus includes a congestion monitor to send a congestion message to an upstream device, wherein the congestion message includes a congestion rate for the data sink.

Example 8 includes the subject matter of any of examples 1 to 7. In this example, the apparatus includes a congestion monitor to send tracer messages to each of a number of data sinks. The congestion monitor determines the congestion rate for each of the data sinks, based, at least in part, on time differences between responses and the tracer messages. The congestion monitor generates a congestion message.

Example 9 includes the subject matter of any of examples 1 to 8. In this example, the apparatus includes an interface to couple the IoT device to a sensor, or an actuator, or both.

Example 10 includes the subject matter of any of examples 1 to 9. In this example, the apparatus includes a fog of devices.

Example 11 includes the subject matter of any of examples 1 to 10. In this example, the apparatus includes a fog of devices that includes an aggregator to assemble multiple data points into messages using the schema.

Example 12 includes the subject matter of any of examples 1 to 11. In this example, the apparatus includes an application specific integrated circuit (ASIC) including the orchestration controller, the schema selector, or the message dispatcher, or any combinations thereof.

Example 13 includes the subject matter of any of examples 1 to 12. In this example, the IoT device includes a traffic monitor to determine traffic state values from inbound data traffic in the IoT device. A cost function calculator iterates through a number of possible schema and message size combinations to determine if a different schema and message size combination has a cost function that is lower than a current schema and message size combination. A schema dispatcher aggregates data into the aggregated data message, and sends the aggregated data message to the data sink.

Example 14 includes the subject matter of example 13. In this example, the apparatus includes a schema manager to select a new schema and message size combination based, at least in part, on the cost function. The schema dispatcher aggregates data into the aggregated data message according to the new schema and message size combination, and sends the aggregated data message to the data sink.

Example 15 includes the subject matter of any of examples 1 to 14. In this example, the apparatus includes an application specific integrated circuit (ASIC) including a cost function calculator, a schema dispatcher, a schema manager, or any combinations thereof.

Example 16 provides a method for selecting a message schema in an internet-of-things (IoT) device, including receiving an orchestration message from a downstream device. A new message size is calculated for a current schema, based, at least in part, on the orchestration message. A data message is sent using the new message size and current schema.

Example 17 includes the subject matter of example 16. In this example, the method includes determining if the new message size is greater than a maximum size or lower than a minimum size for the current schema. If so, a new schema is selected based, at least in part, on the new message size. The data message is sent using the new message size and new schema.

Example 18 includes the subject matter of example 17. In this example, the method includes selecting the new schema based, at least in part, on a lookup table including a size for each of a number of schemas, a latency for each of the number of schemas, and a measured observation rate for each of the number of schemas.

Example 19 includes the subject matter of any of examples 16 to 18. In this example, the method includes determining if a congestion rate is greater than a congestion rate threshold. A change is calculated in the congestion rate, and a determination is made if the change in the congestion rate is greater than a change threshold.

Example 20 includes the subject matter of example 19. In this example, the method includes calculating an observation rate at which observations are being processed. A delta is calculated between a current rate at which observations are being processed, and a previous rate at which observations were being processed. The orchestration message is created if the delta is greater than an observation threshold, and the orchestration message is sent. The orchestration message includes the delta.

Example 21 includes the subject matter of example 19. In this example, the method includes sending tracer messages to each of a number of data sinks. The congestion rate for each of the number of data sinks is determined, based, at least in part, on time differences between responses and the tracer messages. A congestion message including the congestion rate is sent for one on the data sinks.

Example 22 includes the subject matter of example 20. In this example, the method includes receiving the orchestration message in the IoT device.

Example 23 includes the subject matter of any of examples 16 to 22. In this example, the method includes determining if a cost function for a new schema or message size is less than the cost function of a current schema or message size by calculating the cost function for each of a number of schema and message size combination, and determining if a cost function for one of the number of schema and message size combinations is lower than a current schema and message size combination.

Example 24 includes the subject matter of example 23. In this example, the method includes determining that the cost function for one of the number of schema and message size combinations is lower than a current schema and message size combination, and updating the current schema and message size combination with the lower cost function schema and message size combination.

Example 25 includes the subject matter of example 23. In this example, the method includes sending the data message using the current schema and message size combination.

Example 26 includes the subject matter of example 23. In this example, the method includes calculating a current rate at which data observations are arriving. A delta is calculated between the current rate and a previous observation rate for inbound traffic. A determination is made as to whether the delta is greater than a rate threshold. If so, searching for a new schema and message size combination having a cost function less than the cost function of the current schema and message size combination.

Example 27 includes the subject matter of example 23. In this example, the method includes sampling messages sent using the current schema and message size combination to determine a latency value, and updating statistics for the current schema and message size combination.

Example 28 provides a non-transitory, computer readable medium including comprising instructions, which when executed, direct a processor to determine if a change is needed in a message size or schema, and to send an orchestration message to an internet-of-things device to change the message size, the schema, or both.

Example 29 includes the subject matter of example 28. In this example, the non-transitory, computer readable medium includes comprising instructions, which when executed, direct the processor to adjust the message size, determine if the message size is above a maximum size threshold for a current schema, or below a minimum size threshold for the current schema. If so, instructions are included to select a new schema.

Example 30 includes the subject matter of either of examples 28 or 29. In this example, the non-transitory, computer readable medium includes comprising instructions, which when executed, direct the processor to aggregate incoming messages according to the message size schema and schema to form an aggregated message, and to send the aggregated message to a data sink.

Example 31 includes the subject matter of any of examples 28 to 30. In this example, the non-transitory, computer readable medium includes comprising instructions, which when executed, direct the processor to send tracer messages to each of a number of data sinks, and determine a congestion rate for each of the number of data sinks, based, at least in part, on time differences between responses and the tracer messages. Instructions are included to direct the processor to send a congestion message including the congestion rate to an upstream device.

Example 32 includes the subject matter of any of examples 28 to 31. In this example, the non-transitory, computer readable medium includes comprising instructions, which when executed, direct the processor to calculate a cost function for each of a number of message schema and size combinations, and identify a new message schema and size combination with a lower cost function than a current message schema and size combination. Instructions are included to direct the processor to replace the current message schema and size combination with the new message schema and size combination.

Example 33 includes the subject matter of example 32. In this example, the non-transitory, computer readable medium includes comprising instructions, which when executed, direct the processor to determine an incoming observation rate, and determine a rate change for the incoming observation rate.

Example 34 includes the subject matter of example 32. In this example, the non-transitory, computer readable medium includes comprising instructions, which when executed, direct the processor to aggregate incoming messages according to the current message schema and size combination to form an aggregated message, and to send the aggregated message to a data sink.

Example 35 includes the subject matter of example 32. In this example, the non-transitory, computer readable medium includes comprising instructions, which when executed, direct the processor to sample messages sent using the current message schema and size combination, and to update flow statistics for the current message schema and size combination.

Example 36 provides an apparatus for communicating using a message schema, including an internet-of-things (IoT) device, including a communications device to communicate between the IoT device and other devices, and a means to adjust a message size for a schema based, at least in part, on an orchestration message from a downstream device. A message dispatcher aggregates data into an aggregated data message according to a current schema, and sends the aggregated data message to a data sink.

Example 37 includes the subject matter of example 36. In this example, the apparatus includes a means to select a new schema, at least in part, on a message size.

Example 38 includes the subject matter of either of examples 36 or 37. In this example, the apparatus includes a means for determining the orchestration message from a rate at which observations are being processed.

Example 39 includes the subject matter of any of examples 36 to 38. In this example, the apparatus includes a means to determine a congestion rate for a number of data sinks.

Example 40 includes the subject matter of any of examples 36 to 39. In this example, the apparatus includes a means to aggregate multiple data points into messages using the schema.

Example 41 includes the subject matter of any of examples 36 to 40. In this example, the IoT device includes a traffic monitor to determine traffic state values from inbound data traffic in the IoT device, and a means to calculate a select a schema and message size combination based, at least in part, on a cost function calculation. A schema dispatcher aggregates data into the aggregated data message, and sends the aggregated data message to the data sink.

Example 42 provides a non-transitory, machine-readable medium including comprising instructions, which when executed, direct a processor in a node to perform any one of the methods of examples 16 to 27.

Example 43 provides an apparatus including means to perform any one of the methods of examples 16 to 27.

Example 44 provides an apparatus for communicating using a message schema, including an internet-of-things (IoT) device, including a communications device to communicate between the IoT device and other devices. A traffic monitor determines traffic state values from inbound data traffic in the IoT device. A cost function calculator iterates through a set of possible schema and message size combinations to determine if a different schema and message size combination has a cost function that is lower than a current schema and message size combination. If not, a schema dispatcher aggregates data into an aggregated data message according to the current schema and message size combination, and sends the aggregated data message to a data sink.

Example 45 includes the subject matter of example 44. In this example, the apparatus includes a schema manager to select a new schema and message size combination if the cost function is lower than the current schema and message size combination. The schema dispatcher aggregates data into the aggregated data message according to the new schema and message size combination, and sends the aggregated data message to the data sink.

Example 46 includes the subject matter of either of examples 44 or 45. In this example, the message schema includes a single sample schema (SSS), a single device schema (SDS), or a multiple device schema (MDS).

Example 47 includes the subject matter of any of examples 44 to 46. In this example, the communications device includes a radio transceiver, or a network interface controller, or both.

Example 48 includes the subject matter of example 47. In this example, the radio transceiver includes a radio that is compliant with the Institute of Electrical and Electronics Engineers (IEEE) 802.15.4 standard.

Example 49 includes the subject matter of any of examples 44 to 48. In this example, the apparatus includes an interface to couple the IoT device to a sensor, or an actuator, or both.

Example 50 includes the subject matter of any of examples 44 to 49. In this example, the apparatus includes a fog of devices.

Example 51 includes the subject matter of example 50. In this example, the fog of devices includes an aggregator to assemble multiple data points into messages using the schema.

Example 52 includes the subject matter of any of examples 44 to 51. In this example, the apparatus includes an application specific integrated circuit (ASIC) including the cost function calculator, the schema dispatcher, a schema manager, or any combinations thereof.

Example 53 includes the subject matter of any of examples 44 to 52. In this example, the apparatus includes an orchestration controller to accept an orchestration message from a downstream device. A schema selector adjusts a message size based, at least in part, on the orchestration message. A message dispatcher aggregates data into the aggregated data message according to the current schema, and sends the aggregated data message to the data sink.

Example 54 includes the subject matter of example 53. In this example, the schema selector is to select a new schema if the message size is greater than a maximum threshold for the current schema, or less than a minimum threshold for the current schema.

Example 55 includes the subject matter of example 53. In this example, the orchestration message includes a delta between a current rate at which observations are being processed by the data sink, and a previous rate at which observations were being processed by the data sink.

Example 56 includes the subject matter of example 53. In this example, the apparatus includes a congestion monitor to send a congestion message to an upstream device, wherein the congestion message includes a congestion rate for the data sink.

Example 57 includes the subject matter of example 53. In this example, the apparatus includes a congestion monitor to send tracer messages to each of a number of data sinks, and determine the congestion rate for each of the number of data sinks, based, at least in part, on time differences between responses and the tracer messages. The congestion message is generated.

Example 58 includes the subject matter of example 53. In this example, the apparatus includes an application specific integrated circuit (ASIC) including the orchestration controller, the schema selector, or the message dispatcher, or any combinations thereof.

Example 59 provides a method for selecting a message schema in an internet-of-things (IoT) device, including determining if a cost function for a new schema and message size combination is less than the cost function of a current schema and message size combination by calculating the cost function for each of a number of schema and message size combinations, and determining if the cost function for one of the number of schema and message size combinations is lower than a current schema and message size combination.

Example 60 includes the subject matter of example 59. In this example, the method includes determining that the cost function for one of the number of schema and message size combinations is lower than the current schema and message size combination, and updating the current schema and message size combination with the lower cost function schema and message size combination.

Example 61 includes the subject matter of either of examples 59 or 60. In this example, the method includes sending a data message using the current schema and message size combination.

Example 62 includes the subject matter of any of examples 59 to 61. In this example, the method includes calculating a current rate at which data observations are arriving. A delta between the current observation rate and a previous observation rate for inbound traffic is calculated. A determination is made as to whether the delta is greater than a rate threshold, and, if so, then determining if the cost function of the new schema and message size combination is less than the cost function of the current schema and message size combination.

Example 63 includes the subject matter of any of examples 59 to 62. In this example, the method includes sampling messages sent using the current schema and message size combination to determine a latency value, and updating statistics for the current schema and message size combination.

Example 64 includes the subject matter of any of examples 63 to 63. In this example, the method includes wherein updating the statistics includes updating an average number of observations contained in a message, and updating a rate of observations being sent by the device.

Example 65 includes the subject matter of any of examples 59 to 64. In this example, the method includes receiving an orchestration message from a downstream device and calculating a new message size for the current schema, based, at least in part, on the orchestration message. A data message is sent using the new message size and the current schema.

Example 66 includes the subject matter of example 65. In this example, the method includes determining if the new message size is greater than a maximum size or lower than a minimum size for the current schema. If so, the new schema is selected based, at least in part, on the new message size. A data message using the new message size and the new schema.

Example 67 includes the subject matter of example 66. In this example, the method includes selecting the new schema based, at least in part, on a lookup table including a size for each of the number of schemas, a latency for each of the number of schemas, and a measured observation rate for each of the number of schemas.

Example 68 includes the subject matter of example 65. In this example, the method includes determining if a congestion rate is greater than a congestion rate threshold, calculating a change in the congestion rate, and determining if the change in the congestion rate is greater than a change threshold.

Example 69 includes the subject matter of example 68. In this example, the method includes calculating an observation rate at which observations are being processed, and calculating a delta between a current rate at which observations are being processed, and a previous rate at which observations were being processed. If the delta is greater than an observation threshold, the orchestration message is created and sent. The orchestration message includes the delta.

Example 70 includes the subject matter of example 68. In this example, the method includes sending tracer messages to each of a number of data sinks, and determining the congestion rate for each of the data sinks, based, at least in part, on time differences between responses and the tracer messages. A congestion message including the congestion rate id sent for one of the data sinks.

Example 71 provides a non-transitory, computer readable medium including comprising instructions, which when executed, direct a processor to calculate a cost function for each of a number of message schema and size combinations. Instructions are included to direct the processor to identify a new message schema and size combination with a lower cost function than a current message schema and size combination, and replace the current message schema and size combination with the new message schema and size combination.

Example 72 includes the subject matter of example 71. In this example, the non-transitory, computer readable medium includes comprising instructions, which when executed, direct the processor to determine an incoming observation rate, and determine a rate change for the incoming observation rate.

Example 73 includes the subject matter of either of examples 71 or 72. In this example, the non-transitory, computer readable medium includes comprising instructions, which when executed, direct the processor to aggregate incoming messages according to the current message schema and size combination to form an aggregated message, and send the aggregated message to a data sink.

Example 74 includes the subject matter of any of examples 71 to 73. In this example, the non-transitory, computer readable medium includes comprising instructions, which when executed, direct the processor to sample messages sent using the current message schema and size combination, and update flow statistics for the current message schema and size combination.

Example 75 includes the subject matter of any of examples 71 to 74. In this example, the non-transitory, computer readable medium includes comprising instructions, which when executed, direct the processor to determine if a change is needed in a message size or schema, and send an orchestration message to an internet-of-things device to change the message size, the schema, or both.

Example 76 includes the subject matter of example 75. In this example, the non-transitory, computer readable medium includes comprising instructions, which when executed, direct the processor to adjust a message size and determine if the message size is above a maximum size threshold for a current schema, or below a minimum size threshold for the current schema. Instructions are included to direct the processor to select the new schema.

Example 77 includes the subject matter of example 75. In this example, the non-transitory, computer readable medium includes comprising instructions, which when executed, direct the processor to aggregate incoming messages according to the message size and the current schema to form an aggregated message, and send the aggregated message to a data sink.

Example 78 includes the subject matter of example 75. In this example, the non-transitory, computer readable medium includes comprising instructions, which when executed, direct the processor to send tracer messages to each of a number of data sinks, determine a congestion rate for each of the number of data sinks, based, at least in part, on time differences between responses and the tracer messages, and send a congestion message including the congestion rate to an upstream device.

Example 79 provides an apparatus for communicating using a message schema, including an internet-of-things (IoT) device, including a communications device to communicate between the IoT device and other devices. A traffic monitor determines traffic state values from inbound data traffic in the IoT device. A means is included to select a schema and message size combination. A schema dispatcher aggregates the data into an aggregated data message according to the schema and message size combination, and sends the aggregated data message to a data sink.

Example 80 includes the subject matter of example 79. In this example, the apparatus includes an orchestration controller to accept an orchestration message from a downstream device. A means is included to adjust a message size based, at least in part, on the orchestration message. A message dispatcher aggregates data into the aggregated data message according to the current schema, and sends the aggregated data message to the data sink.

Example 81 includes the subject matter of example 80. In this example, the apparatus includes a means to select a new schema based, at least in part. on the message size.

Example 82 includes the subject matter of example 80. In this example, the apparatus includes a means to determine a congestion rate for a data sink.

Example 83 includes the subject matter of example 82. In this example, the apparatus includes a means to determine if an orchestration message is needed, based, at least in part, on the congestion rate.

Example 84 provides a non-transitory, machine-readable medium including comprising instructions, which when executed, direct a processor in a node to perform any one of the methods of examples 59 to 70.

Example 85 provides an apparatus including means to perform any one of the methods of examples 59 to 70.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. An apparatus for communicating using a message schema, comprising an internet-of-things (IoT) device, comprising:
    a communications device to communicate between the IoT device and other devices;
    an orchestration controller to:
        determine if a congestion rate is greater than a congestion rate threshold;
        calculate a change in the congestion rate;
        determine if the change in the congestion rate is greater than a change threshold; and
        accept an orchestration message from a downstream device;
    a schema selector to adjust a message size based, at least in part, on the orchestration message; and
    a message dispatcher to aggregate data into an aggregated data message according to a current schema, and send the aggregated data message to a data sink.

2. The apparatus of claim 1, the schema selector to select a new message schema if the message size is greater than a maximum threshold for a current message schema, or less than a minimum threshold for the current message schema.

3. The apparatus of claim 2, wherein the message schema comprises a single sample schema (SSS), a single device schema (SDS), or a multiple device schema (MDS).

4. The apparatus of claim 1, wherein the orchestration message comprises a delta between a current rate at which observations are being processed by the data sink, and a previous rate at which observations were being processed by the data sink.

5. The apparatus of claim 1, comprising a congestion monitor to send a congestion message to an upstream device, wherein the congestion message comprises at least a congestion rate for the data sink.

6. The apparatus of claim 1, comprising an aggregator to assemble multiple data points into messages using the schema.

7. The apparatus of claim 1, comprising an application specific integrated circuit (ASIC) comprising the orchestration controller, the schema selector, or the message dispatcher, or any combinations thereof.

8. The apparatus of claim 1, comprising an application specific integrated circuit (ASIC) comprising a cost function calculator, a schema dispatcher, a schema manager, or any combinations thereof.

9. The apparatus of claim 1, comprising a cost function calculator to determine if a cost function for a new schema or message size is less than the cost function of a current schema or message size by:
calculating the cost function for each of a plurality of schema and message size combinations; and
determining if a cost function for one of the plurality of schema and message size combinations is lower than a current schema and message size combination.

10. A method for selecting a message schema in an internet-of-things (IoT) device, comprising:
determining if a congestion rate is greater than a congestion rate threshold;
calculating a change in the congestion rate; and
determining if the change in the congestion rate is greater than a change threshold;
receiving an orchestration message from a downstream device;
calculating a new message size for a current schema, based, at least in part, on the orchestration message; and
sending a data message using the new message size and current schema.

11. The method of claim 10, comprising:
determining if the new message size is greater than a maximum size or lower than a minimum size for the current schema; if so,
selecting a new schema based, at least in part, on the new message size; and
sending the data message using the new message size and new schema.

12. The method of claim 11, comprising selecting the new schema based, at least in part, on a lookup table comprising a size for each of a plurality of schemas, a latency for each of the plurality of schemas, and a measured observation rate for each of the plurality of schemas.

13. The method of claim 10, comprising:
calculating an observation rate at which observations are being processed;
calculating a delta between a current rate at which observations are being processed, and a previous rate at which observations were being processed;
creating the orchestration message if the delta is greater than an observation threshold; and
sending the orchestration message, wherein the orchestration message comprises the delta.

14. The method of claim 10, comprising
sending tracer messages to each of a plurality of data sinks;
determining the congestion rate for each of the plurality of data sinks, based, at least in part, on time differences between responses and the tracer messages; and
sending a congestion message comprising the congestion rate for one of the plurality of data sinks.

15. The method of claim 13, comprising receiving the orchestration message in the IoT device.

16. A method for selecting a message schema in an internet-of-things (IoT) device, comprising:
receiving an orchestration message from a downstream device;
calculating a new message size for a current schema, based, at least in part, on the orchestration message;
sending a data message using the new message size and current schema; and
determining if a cost function for a new schema or message size is less than the cost function of a current schema or message size by:
calculating the cost function for each of a plurality of schema and message size combinations; and
determining if a cost function for one of the plurality of schema and message size combinations is lower than a current schema and message size combination.

17. The method of claim 16, comprising:
determining that the cost function for one of the plurality of schema and message size combinations is lower than a current schema and message size combination; and
updating the current schema and message size combination with the lower cost function schema and message size combination.

18. The method of claim 16, comprising sending the data message using the current schema and message size combination.

19. The method of claim 16, comprising:
calculating a current rate at which data observations are arriving;
calculating a delta between the current rate and a previous observation rate for inbound traffic; and
determining if the delta is greater than a rate threshold; and, if so, then
determining if the cost function of the new schema and message size combination is less than the cost function of the current schema and message size combination.

20. The method of claim 16, comprising:
sampling messages sent using the current schema and message size combination to determine a latency value; and
updating statistics for the current schema and message size combination.

21. The method of claim 16, comprising:
determining if a congestion rate is greater than a congestion rate threshold;
calculating a change in the congestion rate; and
determining if the change in the congestion rate is greater than a change threshold.

22. A non-transitory, computer readable medium comprising instructions, which when executed, direct a processor to:
determine if a congestion rate is greater than a congestion rate threshold;
calculate a change in the congestion rate;
determine if the change in the congestion rate is greater than a change threshold;
determine if a change is needed in a message size or schema; and
send an orchestration message to an internet-of-things device to change the message size, the schema, or both.

23. The non-transitory, computer readable medium of claim 22, comprising instructions, which when executed, direct the processor to:

adjust the message size;

determine if the message size is above a maximum size threshold for a current schema, or below a minimum size threshold for the current schema; and select a new schema.

24. The non-transitory, computer readable medium of claim 22, comprising instructions, which when executed, direct the processor to:

aggregate incoming messages according to the message size schema and schema to form an aggregated message; and send the aggregated message to a data sink.

25. The non-transitory, computer readable medium of claim 22, comprising instructions, which when executed, direct the processor to:

send tracer messages to each of a plurality of data sinks;

determine a congestion rate for each of the plurality of data sinks, based, at least in part, on time differences between responses and the tracer messages; and send a congestion message comprising the congestion rate to an upstream device.

26. The non-transitory, computer readable medium of claim 22, comprising instructions, which when executed, direct the processor to determine if a cost function for a new schema or message size is less than the cost function of a current schema or message size by:

calculating the cost function for each of a plurality of schema and message size combinations; and determining if a cost function for one of the plurality of schema and message size combinations is lower than a current schema and message size combination.

\* \* \* \* \*